(12) United States Patent
Miyamoto et al.

(10) Patent No.: US 8,115,699 B2
(45) Date of Patent: Feb. 14, 2012

(54) POSITION DETECTING SYSTEM AND POSITION DETECTING PROGRAM

(75) Inventors: Shigeru Miyamoto, Kyoto (JP); Takao Sawano, Kyoto (JP); Hitoshi Yamazaki, Kyoto (JP); Shinya Kawada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1389 days.

(21) Appl. No.: 11/450,451

(22) Filed: Jun. 12, 2006

(65) Prior Publication Data

US 2007/0080831 A1    Apr. 12, 2007

(30) Foreign Application Priority Data

Oct. 12, 2005    (JP) .................................. 2005-297969

(51) Int. Cl.
*G09G 5/00* (2006.01)
(52) U.S. Cl. ............. 345/2.1; 345/2.3; 345/1.1; 345/1.3
(58) Field of Classification Search .......... 345/156–158, 345/162, 169, 1.1–1.3, 2.1–2.3, 3.1
See application file for complete search history.

(56) References Cited

U.S. PATENT DOCUMENTS

| | | | | |
|---|---|---|---|---|
| 5,572,653 A | * | 11/1996 | DeTemple et al. | 345/501 |
| 5,806,017 A | * | 9/1998 | Hancock | 701/209 |
| 5,995,015 A | * | 11/1999 | DeTemple et al. | 340/5.9 |
| 6,924,741 B2 | * | 8/2005 | Tamayama et al. | 340/572.1 |
| 7,443,295 B2 | * | 10/2008 | Brice et al. | 340/568.5 |
| 7,511,630 B2 | * | 3/2009 | Strickland et al. | 340/815.4 |
| 2004/0051644 A1 | * | 3/2004 | Tamayama et al. | 340/686.1 |
| 2004/0125044 A1 | * | 7/2004 | Suzuki | 345/1.1 |
| 2005/0128184 A1 | * | 6/2005 | McGreevy | 345/156 |
| 2005/0264416 A1 | * | 12/2005 | Maurer | 340/539.13 |
| 2007/0030152 A1 | * | 2/2007 | Sprague | 340/572.1 |

FOREIGN PATENT DOCUMENTS

| | | |
|---|---|---|
| JP | 01-292916 | 11/1989 |
| JP | 2000-98034 | 4/2000 |

* cited by examiner

*Primary Examiner* — Jason Mandeville
(74) *Attorney, Agent, or Firm* — Nixon & Vanderhye P.C.

(57) ABSTRACT

A plurality of positional information transmitters 100, each of which transmits positional information to which a plurality of unit spaces are each uniquely assigned, are disposed on a ceiling. A mobile terminal 10 receives the positional information transmitted from each of the positional information transmitters 100 and changes a terminal-side image in accordance with the received positional information. Furthermore, the mobile terminal 10 transmits to a server 300 current positional information and operation information indicating an instruction inputted by a user. The server 300 changes, in accordance with the current positional information and the operation information received by the mobile terminal 10, a floor image displayed on a plurality of floor displays 200 disposed on a floor. Thus, it becomes possible to provide a highly interesting and novel position detecting system.

8 Claims, 23 Drawing Sheets

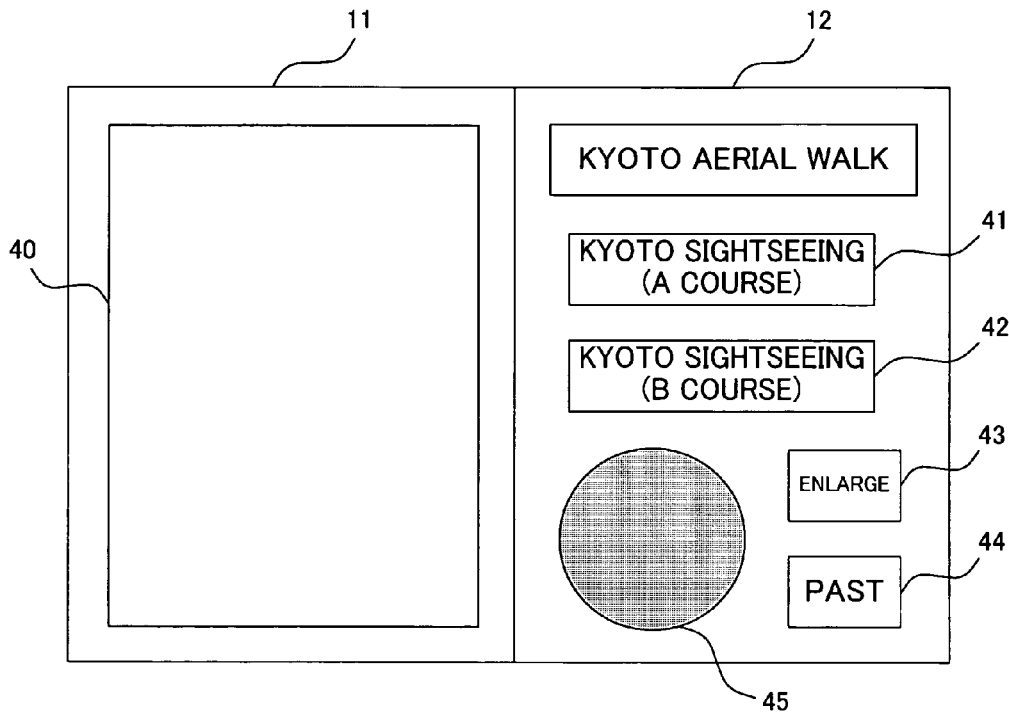
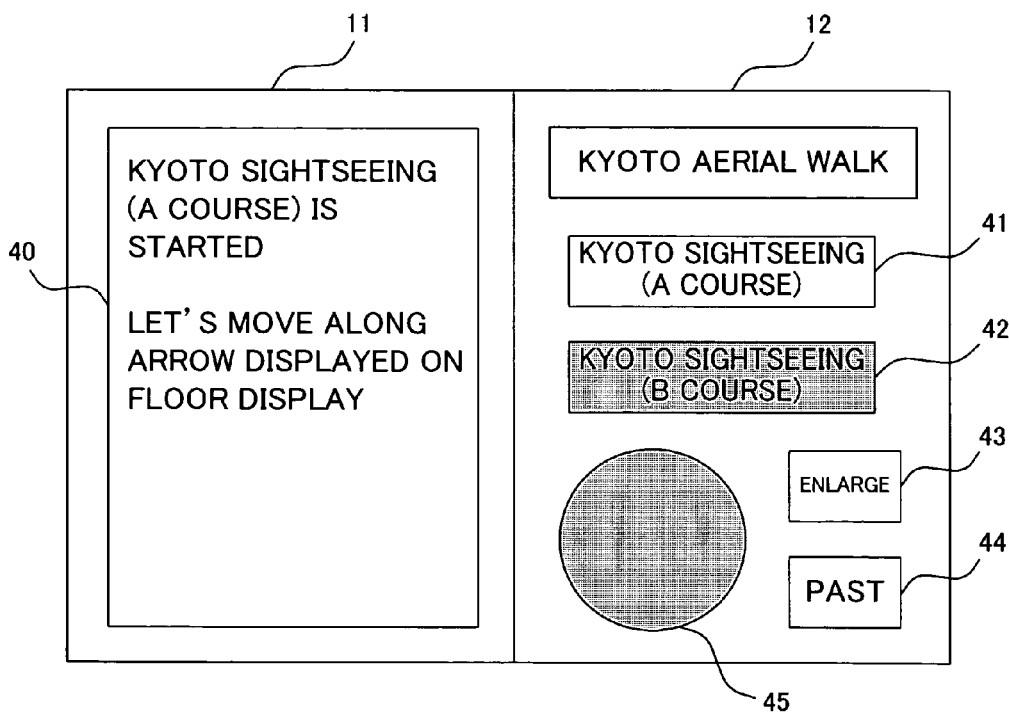

- 50 TERMINAL-SIDE POSITION DETECTING PROGRAM
- 51 EVENT TABLE
- 52 DESCRIPTION DATA
- 53 RECEIVING TIME DATA

| EVENT TABLE 51 | | |
|---|---|---|
| CURRENT POSITION | DESCRIBE EVENT | DISCOVER EVENT |
| (0, 1) | NO | NO |
| (0, 2) | KINKAKUJI | NO |
| (0, 3) | NO | YES |
| ⋮ | ⋮ | ⋮ |
| (6, 8) | GOJYO OHASHI BRIDGE | YES |
| ⋮ | ⋮ | ⋮ |

| RECEIVING TIME DATA 53 ||
|---|---|
| POSITIONAL INFORMATION | RECEIVING TIME |
| (0, 1) | 10 |
| (0, 2) | 60 |
| (0, 3) | 13 |
| ⋮ | ⋮ |

FIG. 27

DISCOVER EVENT TABLE 57

| CURRENT POSITION | EVENT PICTURE DATA |
|---|---|
| (0, 3) | PICTURE DATA A |
| (6, 8) | PICTURE DATA B |
| ⋮ | ⋮ |

FIG. 28

SIGHTSEEING COURSE DATA 60

A COURSE

| DESTINATION | COORDINATES OF DESTINATION | ARRIVAL FLAG |
|---|---|---|
| DESTINATION A | (Xa, Ya) | ON |
| DESTINATION B | (Xb, Yb) | ON |
| DESTINATION C | (Xc, Yc) | OFF |
| ⋮ | ⋮ | ⋮ |

B COURSE

| DESTINATION | COORDINATES OF DESTINATION | ARRIVAL FLAG |
|---|---|---|
| DESTINATION F | (Xf, Yf) | OFF |
| DESTINATION G | (Xg, Yg) | OFF |
| DESTINATION H | (Xh, Yh) | OFF |
| ⋮ | ⋮ | ⋮ |

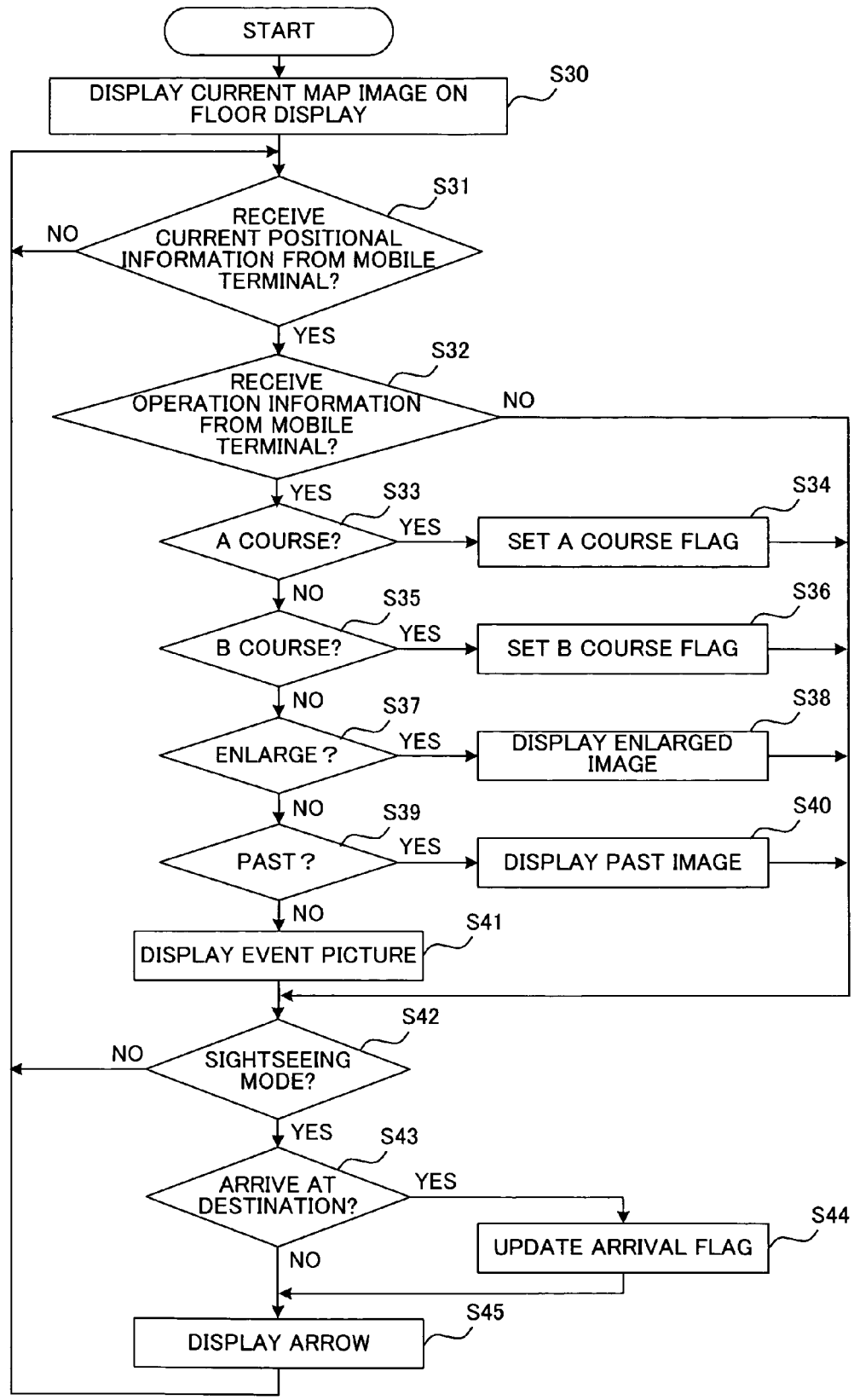

POSITION DETECTING SYSTEM AND POSITION DETECTING PROGRAM

CROSS REFERENCE TO RELATED APPLICATION

The disclosure of Japanese Patent Application No. 2005-297969 is incorporated herein by reference.

BACKGROUND OF THE INVENTION

1. Field of the Invention

The technology presented herein relates to a position detecting system and a position detecting program.

2. Description of the Background Art

Japanese Laid-Open Patent Publication No. 1-292916 (hereinafter, referred to as patent document 1) discloses a system in which positional information transmitted from an infrared transmitter is received by means of a transponder, and then transmitted to an information center, thereby determining a position of a person carrying the transponder.

Japanese Laid-Open Patent Publication No. 2000-98034 (hereinafter, referred to as patent document 2) discloses a system in which positional information transmitted from an infrared transmitter is received by means of a mobile terminal, and an image displayed on a screen of the mobile terminal is changed based on the received positional information. Specifically, as shown in FIG. 6 of patent document 2, a drawing of a room is previously displayed on the screen of the mobile terminal, and based on the received positional information, a route from a current position to a destination is superimposed on the drawing of the room to be displayed.

However, in the system disclosed in patent document 1, an image displayed on a screen of the transponder is not changed based on the received positional information. In addition, in the system disclosed therein, the image displayed on a display device other than the transponder (e.g., a display device controlled by the information center) is not changed based on the positional information received by means of the transponder and operation information indicating an operation inputted on the transponder by a user.

Furthermore, in the system disclosed in patent document 2, although the image displayed on the screen of the mobile terminal is changed based on the received positional information, an image displayed on a display device other than the mobile terminal is not changed based on the positional information received by means of the mobile terminal and operation information obtained by operating the mobile terminal.

SUMMARY

Therefore, a feature of an example embodiment presented herein is to provide a position detecting system and a position detecting program capable of changing an image displayed on a mobile terminal based on positional information received by the mobile terminal, and capable of changing an image displayed on an external display device based on the positional information received by the mobile terminal and operation information obtained by operating the mobile terminal.

The position detecting system of the present embodiment comprises: a positional information transmission device (100, 400) for transmitting positional information; a mobile terminal (10) for receiving the positional information; and a control device (200, 300) capable of communicating with the mobile terminal.

According to a first preferred variant of the position detecting system of the present embodiment, the second image processing means selects a partial area of the second image, the partial area corresponding to a current position of the mobile terminal, based on the current positional information received by the second receiving means, and changes the selected partial area of the second image in accordance with the operation information received by the second receiving means.

According to a second preferred variant of the position detecting system of the present embodiment, the plurality of positional information transmitters are disposed on a ceiling, and the second display means is disposed on a floor.

According to a third preferred variant of the position detecting system of the present embodiment, each of the positional information transmitters transmits the positional information for a predetermined number of times at an interval of a predetermined period of time, and the mobile terminal further includes current positional information generating means for measuring, for the predetermined period of time, a receiving time of each piece of the positional information received by the first receiving means, and generating the current positional information based on the receiving time of the each piece of the positional information.

According to a fourth preferred variant of the position detecting system of the present embodiment, the current positional information generating means generates the current positional information indicating a position which is more accurate than that indicated by the positional information, based on a ratio of the receiving time of each piece of the positional information received, for a period of time, by the first receiving means, to a transmission time of the each piece of the positional information transmitted for the period of time.

According to a fifth preferred variant of the position detecting system of the present embodiment, the current positional information generating means calculates a weighted average of two-dimensional coordinates indicating the positional information by dividing a sum of the positional information received for the period of time by the first receiving means, in accordance with a total receiving time of the positional information, such that the current positional information means generates the current positional information.

According to a sixth preferred variant of the position detecting system of the present embodiment, the first image processing means changes the first image in accordance with the positional information received by the first receiving means such that the first image includes a description text corresponding to the received positional information.

According to a seventh preferred variant of the position detecting system of the present embodiment, the first image includes one of an selectable button image and a non-selectable button image, which are changed in accordance with the positional information received by the first receiving means, and the first image processing means changes a display mode of the button image in accordance with the positional information received by the first receiving means.

According to an eighth preferred variant of the position detecting system of the present embodiment, the operation information includes instruction information indicating an enlargement display instruction, and the second image processing means enlarges, in accordance with the instruction information indicating the enlargement display instruction, a portion of the second image centering on a position of the second image, the position corresponding to the current positional information received by the second receiving means.

According to a ninth preferred variant of the position detecting system of the present embodiment, the operation information includes instruction information indicating a guide request instruction, and the second image processing means adds, in accordance with the instruction information indicating the guide request instruction, a mark for guiding the user to a predetermined position, on a position of the second image, the position corresponding to the current positional information received by the second receiving means.

A computer-readable storage medium stores a position detecting program executed by a computer (21) of a mobile terminal and a computer (302) of a control device in a position detecting system comprising: a positional information transmission device (100, 400) including a plurality of positional information transmitters (100) for transmitting positional information to which a plurality of unit spaces are each uniquely assigned; the mobile terminal (10) for receiving the positional information; and the control device capable of communicating with the mobile terminal.

The position detecting program instructs the computer (21) of the mobile terminal to perform: first display control means for causing first display means (11, 12) of the mobile terminal to display a first image; first receiving control means for causing first receiving means (34) of the mobile terminal to receive the positional information transmitted from the positional information transmitters; first image processing means for changing the first image in accordance with the positional information received by the first receiving means; and transmission control means for causing transmission means (33) of the mobile terminal to transmit to the control device current positional information corresponding to the positional information received by the receiving means and operation information, inputted by operation means of the mobile terminal, which indicates an instruction of a user.

Furthermore, the position detecting program instructs the computer (302) of the control device to perform: second display control means for causing second display means (200) of the control device to display a second image; second receiving control means for causing second receiving means (303) of the control device to receive the current positional information and the operation information transmitted from the mobile terminal; and second image processing means for changing the second image in accordance with the current positional information and the operation information received by the second receiving means.

According to the position detecting system of the present embodiment, the mobile terminal receives the positional information, whereby the first image displayed on the first display means of the mobile terminal is changed. Furthermore, the current positional information generated based on the positional information received by the mobile terminal and the operation information indicating the instruction inputted by the user through the operation means are transmitted from the mobile terminal to the control device, whereby the second image displayed on the second display means of the control device is changed. Thus, it becomes possible to provide a highly interesting and novel position detecting system.

According to the first preferred variant of the position detecting system of the present embodiment, a portion of the second image displayed on the second display means, the portion corresponding to the received current positional information is changed. Thus, a portion of the second image, the portion corresponding to the current positional information of the mobile terminal can be changed in accordance with the operation information.

According to the second variant of the position detecting system of the present embodiment, the second display means is disposed on the ground, thereby making it possible to provide a visual effect which changes an image displayed on the user's feet when the user operates the mobile terminal.

According to the third variant of the position detecting system of the present embodiment, even when the mobile terminal can receive a plurality of pieces of the positional information, the current positional information is generated based on a receiving frequency of each of the pieces of the positional information, thereby making it possible to accurately detect the current position of the mobile terminal.

According to the fourth variant of the position detecting system of the present embodiment, the current positional information is detected based on the ratio of the receiving time of each piece of the positional information to the transmission time of each piece of the positional information, thereby making it possible to detect the current position of the mobile terminal, the current position being more accurately indicated than that indicated by the positional information.

According to the fifth variant of the position detecting system of the present embodiment, the current position of the mobile terminal can be easily obtained by calculating the weighted average of the received positional information.

According to the sixth variant of the position detecting system of the present embodiment, when the user carrying the mobile terminal moves to a location, the description text corresponding to the location can be automatically displayed on the first display means of the mobile terminal.

According to the seventh variant of the position detecting system of the present embodiment, the button image displayed on the first display means of the mobile terminal can be selectable only when the user carrying the mobile terminal is in a specific position. Furthermore, the display mode of the button image is changed, thereby making it possible to inform the user whether the button image is selectable or non-selectable.

According to the eighth variant of the position detecting system of the present embodiment, the user can enlarge a portion of the second image displayed on the second display means, the portion corresponding to the current position of the mobile terminal carried by the user.

According to the ninth variant of the position detecting system of the present embodiment, the user can be guided to a destination based on the second image displayed on the second display means.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 16 shows an exemplary terminal-side image;

FIG. 17 shows another exemplary terminal-side image;

FIG. 27 shows an exemplary "discover" event table 57;

FIG. 28 shows exemplary sightseeing course data 60;

FIG. 30 is a flowchart illustrating a flow of a process executed by a CPU 302 of the server 300.

DESCRIPTION OF THE PREFERRED EMBODIMENTS

Hereinafter, a position detecting system according to an embodiment will be described in detail.

Figure 1:
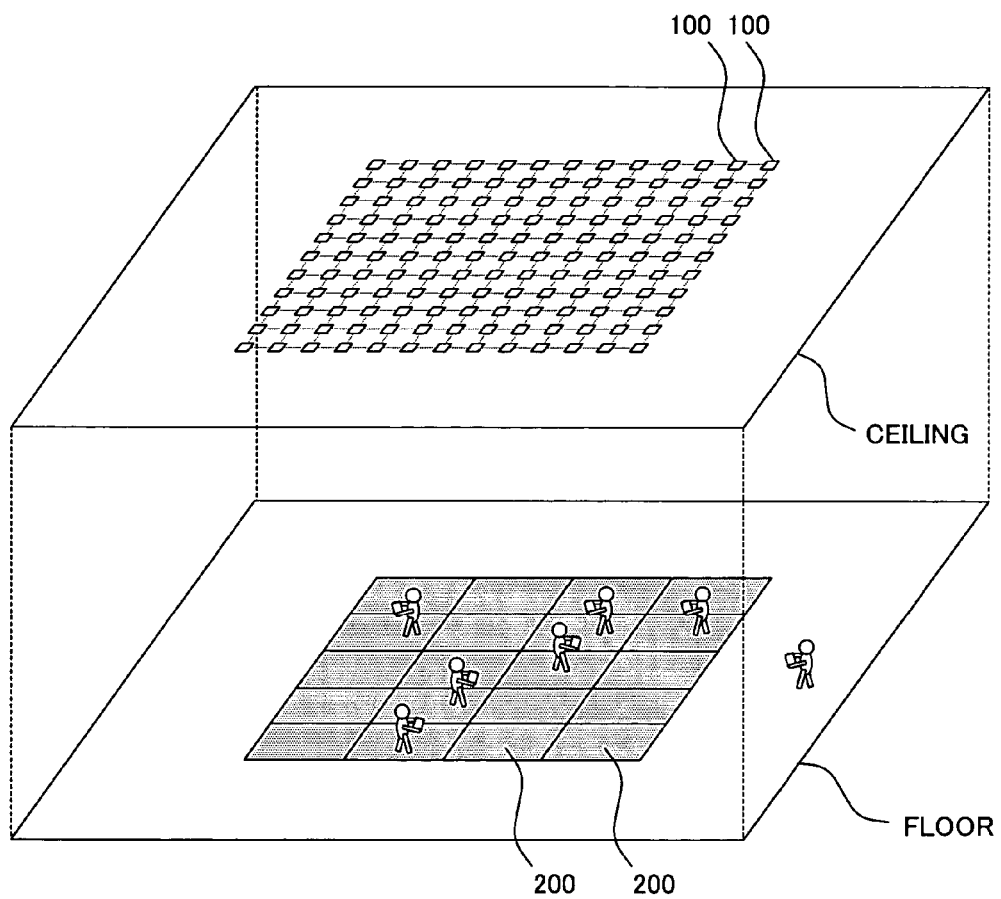
FIG. 1 is an external view of a position detecting system.
Figure 2:
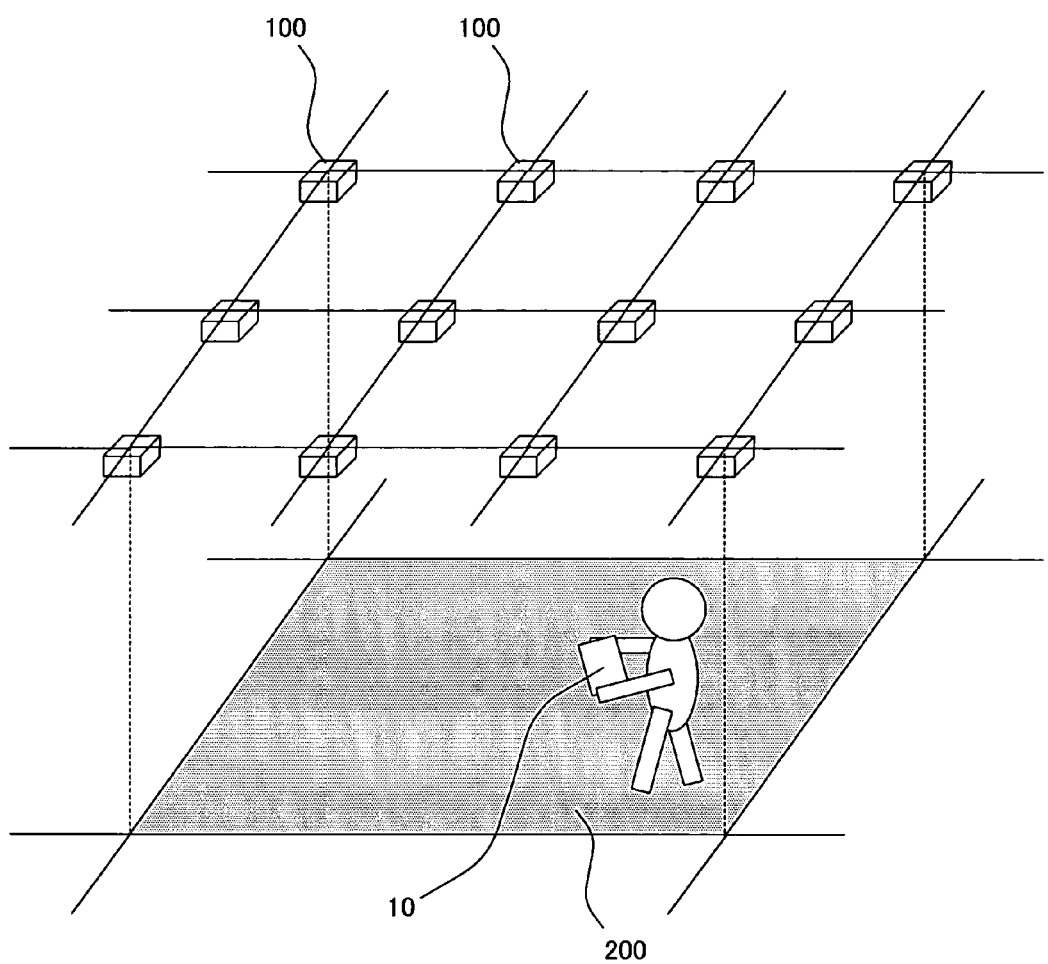
FIG. 2 is a view illustrating a positional relationship between positional information transmitters 100 and a floor display 200.

FIG. 1 shows an outline of the position detecting system according to an example embodiment. In the present embodiment, a plurality of positional information transmitters 100 are mounted on a ceiling, and a plurality (e.g., 70) of floor displays 200 are mounted on a floor. As shown in FIG. 2, above each of the floor displays 200, the plurality of positional information transmitters 100 are disposed in a form of a matrix. A user carrying a mobile terminal 10 can freely move on the floor displays 200.

Figure 3:
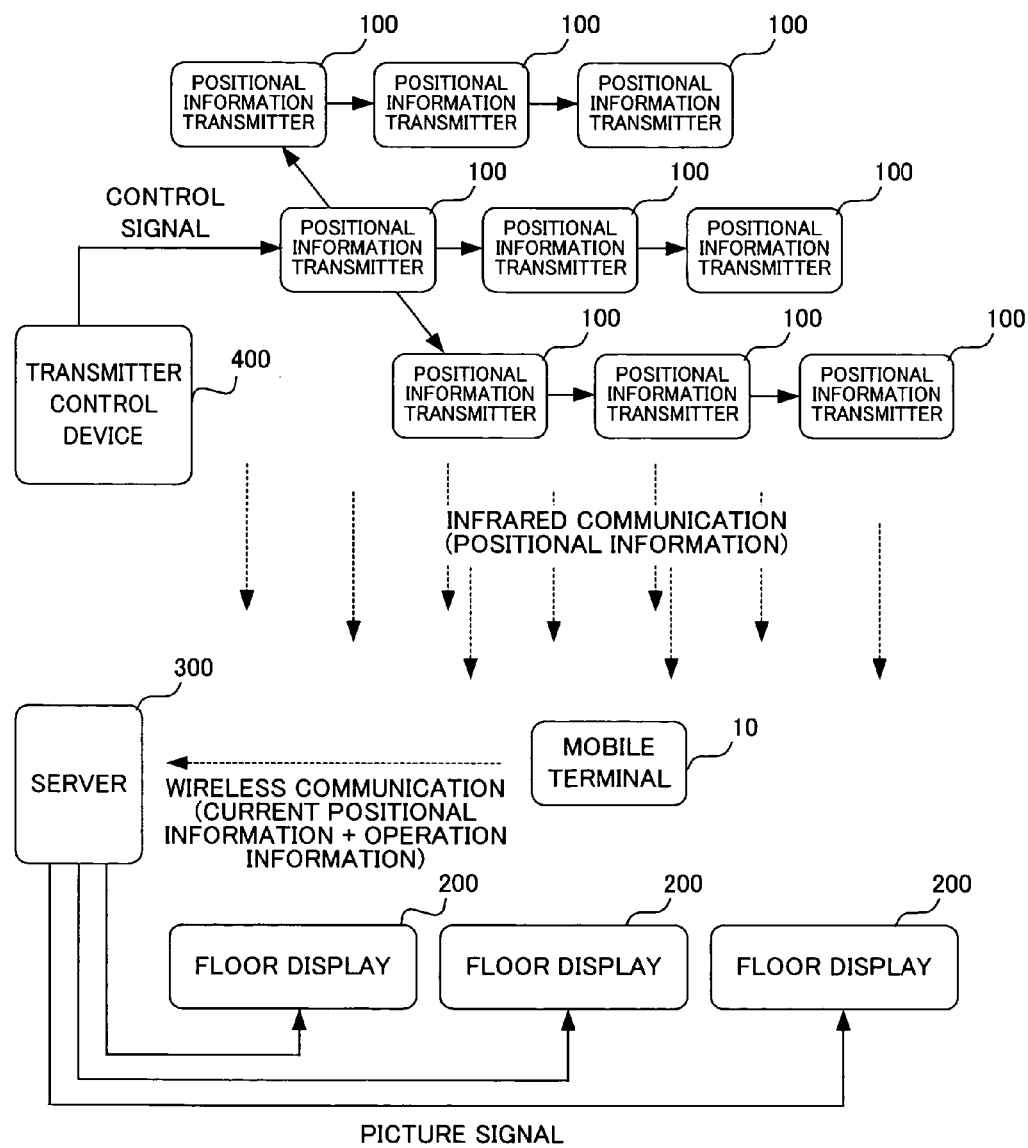
FIG. 3 is a block diagram illustrating a configuration of the position detecting system.

FIG. 3 is a block diagram illustrating an overall configuration of the position detecting system according to the present embodiment. Each of the plurality of pieces of positional information transmitters 100 mounted on the ceiling transmits an infrared ray at a predetermined timing in accordance with a control signal outputted from a transmitter control device 400. The infrared ray includes positional information. The positional information is used for determining a current position of the mobile terminal 10. Each of the plurality of floor displays 200 mounted on the floor displays an image in accordance with a picture signal outputted from a server 300. The mobile terminal 10 carried by the user has a function of receiving infrared rays transmitted from the positional information transmitters 100. Upon receiving the infrared rays transmitted from the positional information transmitters 100, the mobile terminal 10 determines the current position thereof based on the positional information superimposed on the infrared rays. Thereafter, the mobile terminal 10 transmits to the server 300, by radio communication, current positional information indicating the current position of the mobile terminal 10 and operation information corresponding to an operation inputted by the user. In accordance with the current positional information and the operation information both received from the mobile terminal 10, the server 300 changes the image displayed on the floor displays 200 so as to correspond to the current positional information.

Next, the mobile terminal 10 will be described in detail. Although a hand-held game device is used as the mobile terminal 10 in the present embodiment, it is understood that the present invention is not limited thereto.

Figure 4:
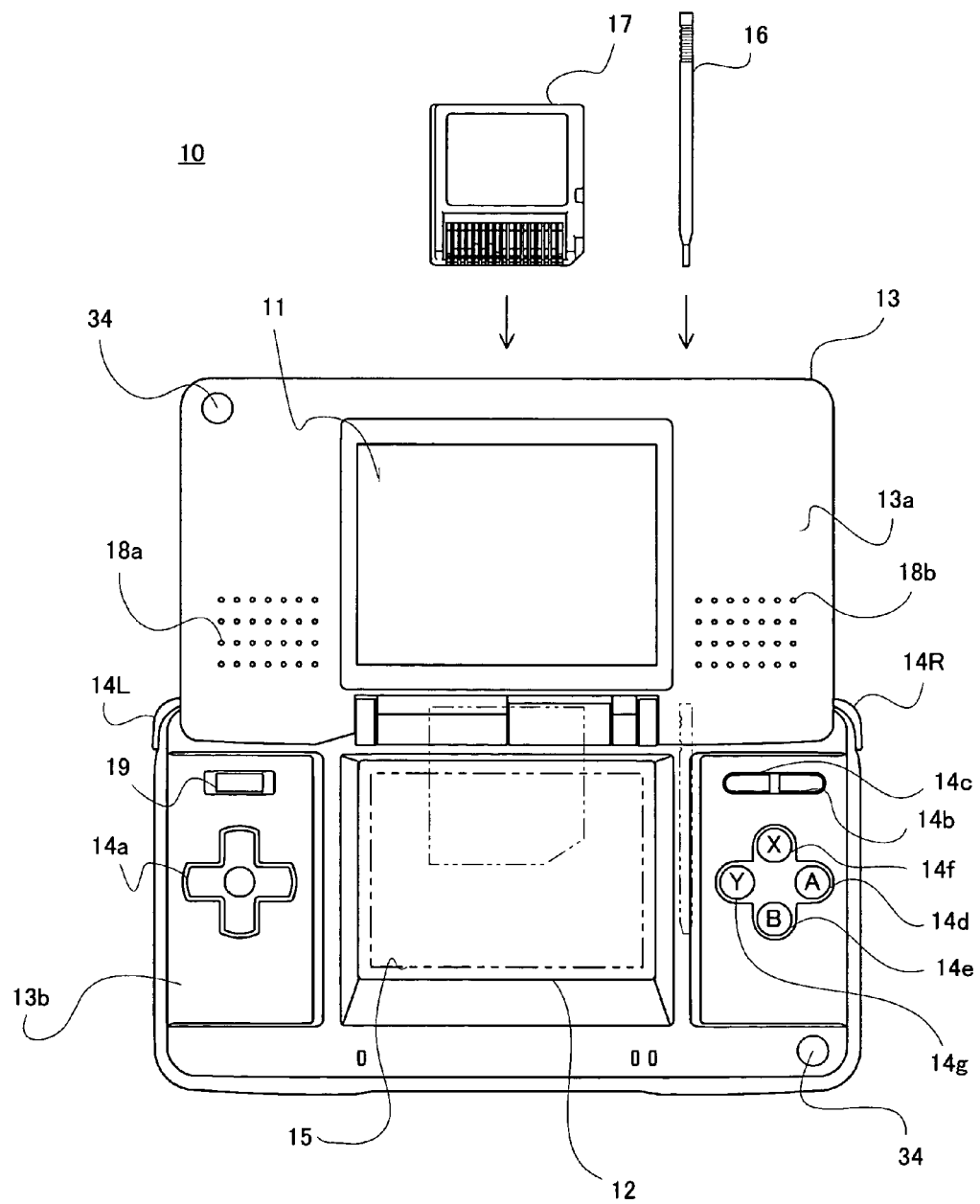
FIG. 4 is an external view of a mobile terminal 10.

FIG. 4 is an external view of the mobile terminal 10. In FIG. 4, the mobile terminal 10 includes a first LCD (Liquid Crystal Display) 11 and a second LCD 12. A housing 13 includes an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that although a LCD is used as a display device in the present embodiment, any other display such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 5) to an exterior.

The lower housing 13b is provided with input devices as follows; a cross switch 14a, a start switch 14b, a select switch 14c, an "A" button 14d, a "B" button 14e, an "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16. Note that if only the touch panel 15 is used as an input device, the cross switch 14a, the start switch 14b, the select switch 14c, the "A" button 14d, the "B" button 14e, the "X" button 14f, the "Y" button 14g, the "L" button 14L, and the "R" button 14R may not be provided.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. The following description is provided on an assumption that a player uses the stick 16 to operate the touch panel 15. However, the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

Furthermore, the mobile terminal 10 includes two infrared receiving units 34, each of which is provided with the upper housing 13a or the lower housing 13b, for receiving the infrared rays transmitted from the positional information transmitters 100. Each of the infrared receiving units 34 must be disposed at a position so as not to be covered with a hand or a finger of the user carrying the mobile terminal 10. In the present embodiment, the two infrared receiving units 34 are disposed at corners, on the mobile terminal 10, which are diagonally opposite to each other with a distance therebetween. Thus, even if one infrared receiving unit 34 were covered with the hand or the finger of the user, the other infrared receiving unit 34 could receive the infrared rays transmitted from the positional information transmitters 100.

The memory card 17 is a storage medium having a computer program (a position detecting program) stored therein, and placed in the insertion slot provided at the lower housing 13b in a removable manner.

Next, with reference to FIG. 5, an internal configuration of the mobile terminal 10 will be described in detail.

Figure 5:
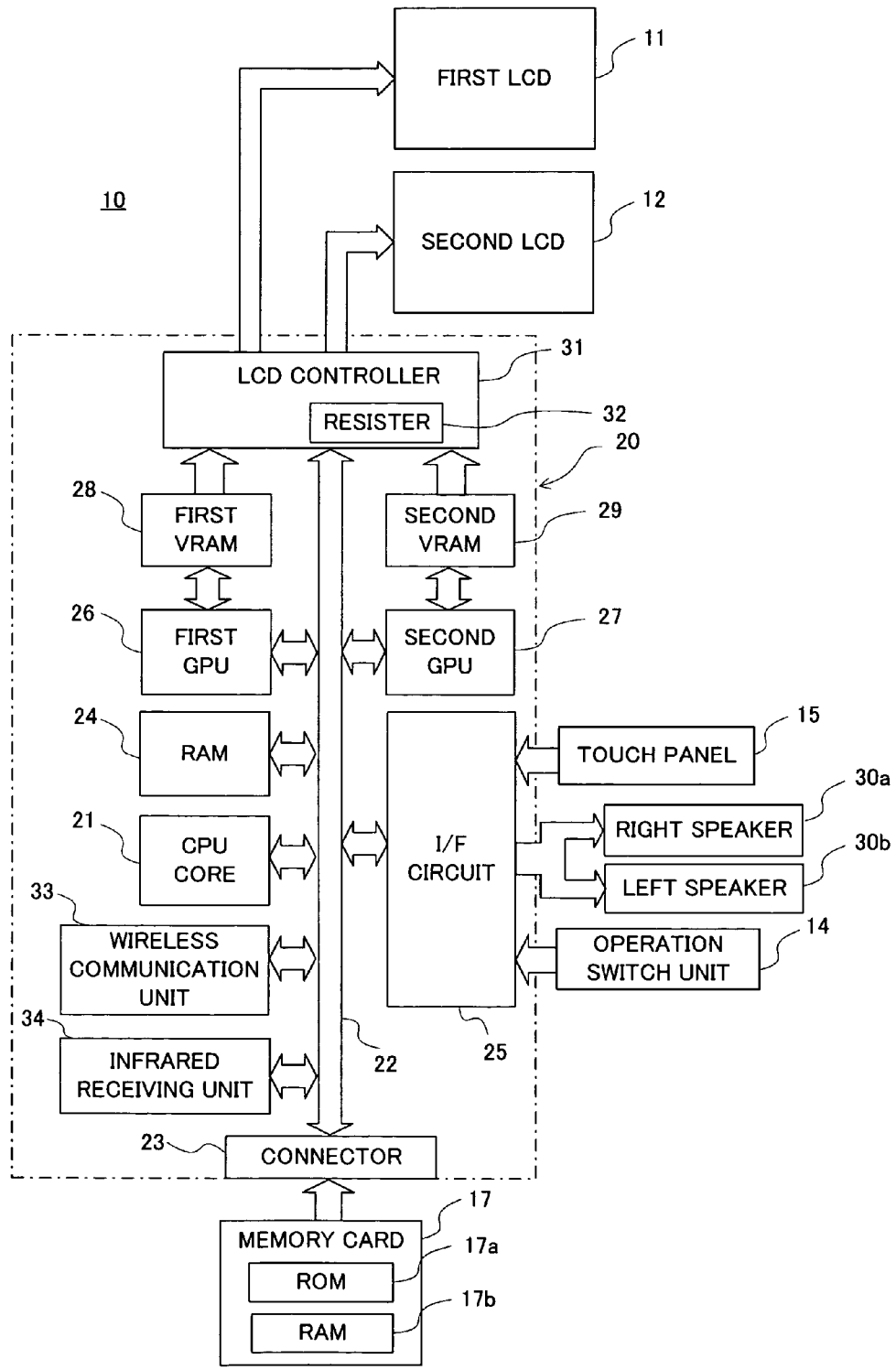
FIG. 5 is a block diagram illustrating an internal configuration of the mobile terminal 10.
Figure 6:
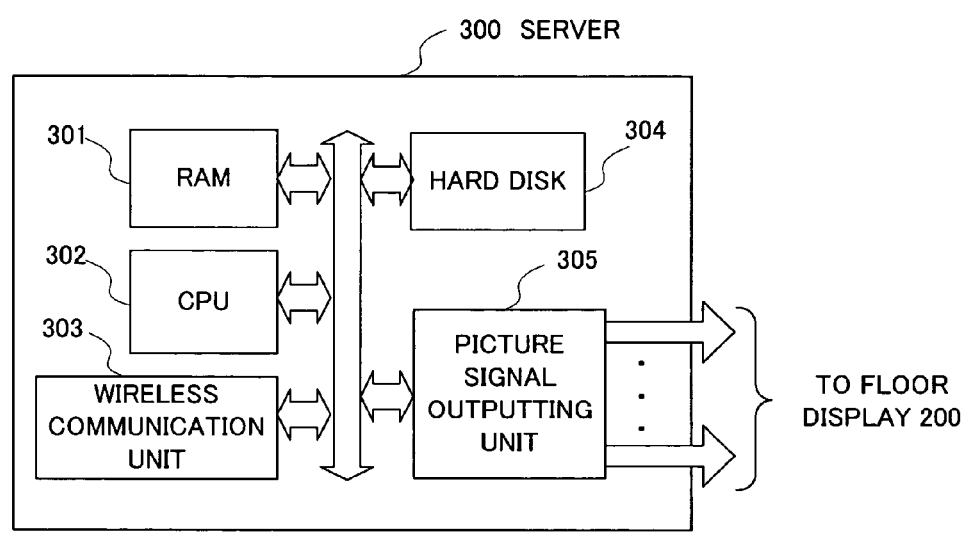
FIG. 6 is a block diagram illustrating an internal configuration of a server 300.

In FIG. 5, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, a LCD controller 31, a wireless communication unit 33 and the infrared receiving units 34. The memory card 17 is connected to the connector 23 in a removable manner. The memory card 17 includes a ROM 17a for storing the position detecting program and a RAM 17b for storing backup data in a rewritable manner. The position detecting program stored in the ROM 17a of the memory card 17 is loaded to the RAM 24, and the position detecting program having been loaded to the RAM 24 is executed by the CPU core 21. The RAM 24 stores, in addition to the position detecting program, data such as temporary data which is obtained by the CPU core 21 executing the position detecting program, and image data. To the I/F circuit 25 are connected, the touch panel 15, the right loudspeaker 30a, the left loudspeaker 30b and an operation switch unit 14, comprised of the cross switch 14a, the "A" button 14d, and others, as shown in FIG. 4. The right loud speaker 30a and the left loudspeaker 30b are arranged in an interior of the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU generates a first image based on the image data which is stored in the RAM 24, and writes images into the first VRAM 28. The second GPU 27 also follows an instruction from the CPU core 21 to generate a second image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first image which has been written into the VRAM 28, and outputs to the second LCD 12 the second image which has been written into the second VRAM 29. When the value of the resister 32 is 1, the first image which has been written into the first VRAM 28 is outputted to the LCD 12, and the second image which has been written into the second VRAM 29 is outputted to the first LCD 11.

The wireless communication unit 33 provides a function of performing wireless communication with a server 300 and other mobile terminals, so that various types of information are exchanged therebetween.

Further, the configuration of the mobile terminal 10 as described above is merely an example. The mobile terminal of the present invention may include at least a function of displaying an image, a function of receiving a signal outputted from the positional information transmitters, a function of detecting an operation inputted by the user, and a function of transmitting a signal to the server 300.

Next, the server 300 will be described in detail.

The server 300 includes a RAM 301, a CPU 302, a wireless communication unit 303, a hard disk 304, and a picture signal outputting unit 305. The hard disk 304 stores a computer program (i.e., the position detecting program) and image data. The position detecting program is loaded to the RAM 301, and the position detecting program having been loaded to the RAM 301 is executed by the CPU 302. The RAM 301 stores, in addition to the position detecting program, data such as temporary data which is obtained by the CPU 302 executing the position detecting program, and image data. The wireless communication unit 303 provides a function of performing wireless communication with the wireless communication unit 33 of the mobile terminal 10. The picture signal outputting unit 305 outputs a picture signal based on the image data generated by the CPU 302 to each of the floor displays 200.

Although the present embodiment illustrates an example where the position detecting program according to the present invention is provided to the mobile terminal 10 and the server 300 via an external storage medium such as the memory card 17, the present invention is not limited thereto. The position detecting program may be provided to the mobile terminal 10 and the server 300 via a wire communication line or a wireless communication line. Alternatively, the position detecting program may previously be stored in nonvolatile memories provided in the mobile terminal 10 and the server 300.

In the following description, when necessary, the position detecting program executed at a side of the mobile terminal 10 is referred to as a "terminal-side position detecting program", and the position detecting program executed at a side of the server 300 is referred to as a "server-side position detecting program".

Figure 7:
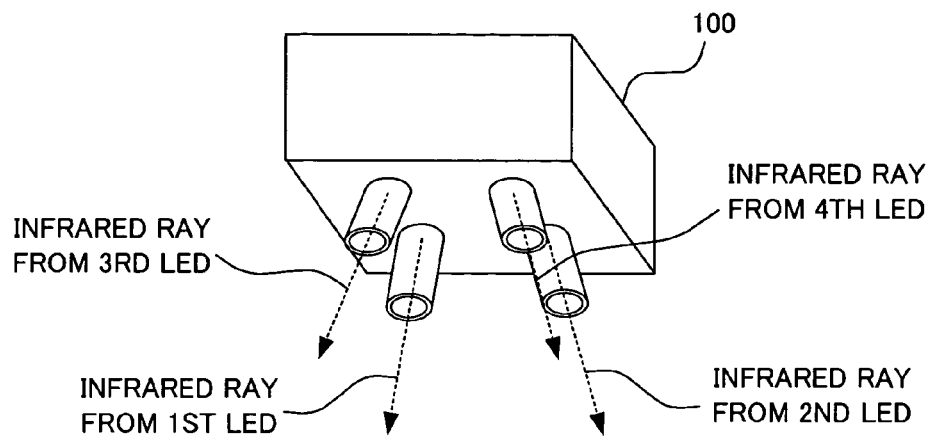
FIG. 7 is an external view of the positional information transmitter 100.
Figure 8:
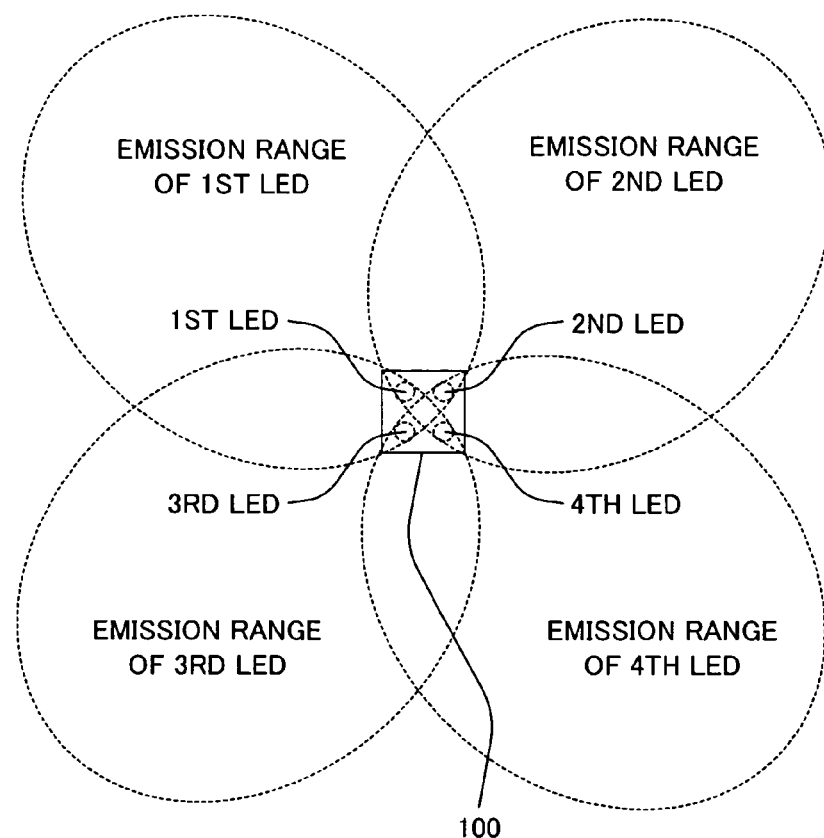
FIG. 8 is a view illustrating four emission ranges of infrared rays emitted from the positional information transmitter 100.

Next, a structure of the positional information transmitter 100 will be described. As shown in FIG. 7, the positional information transmitter 100 is structured such that a housing thereof contains four infrared LEDs (Light Emitting Diodes). All infrared rays emitted from the infrared LEDs (a first LED, a second LED, a third LED, and a fourth LED) are emitted from the ceiling to the floor. However, these infrared rays are not emitted in parallel with each other (i.e., the infrared rays are not emitted vertically with respect to the floor). Each of the infrared rays is emitted, as shown in FIG. 8, diagonally outward from the ceiling to the floor. Note that an emission range of each of the infrared LEDs can be adjusted to a certain extent by changing a length of a cylindrical member, shown in FIG. 7, through which an infrared ray passes.

Figure 9:
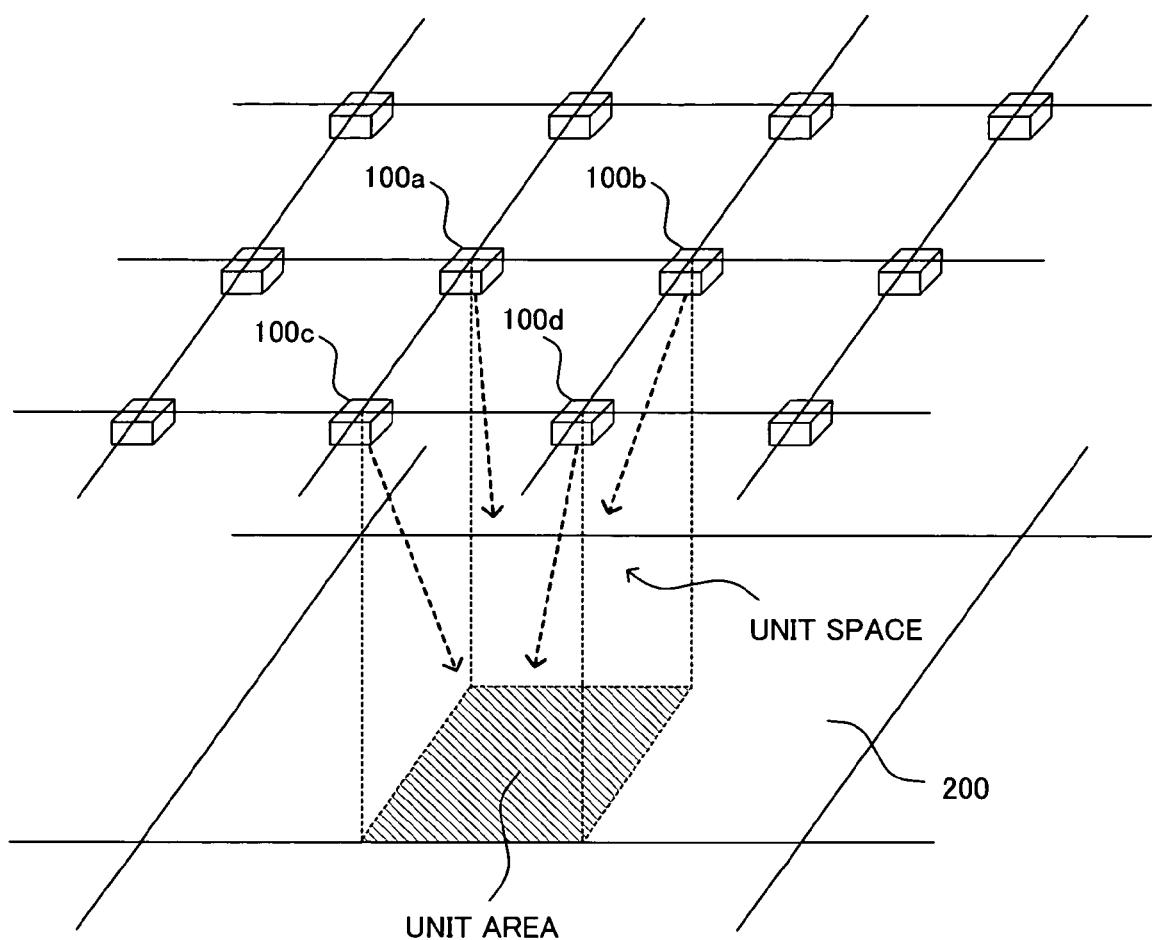
FIG. 9 is a view illustrating a unit space and a unit area.

Then, a method of transmitting the positional information by means of the positional information transmitters 100 will be described. As shown in FIG. 9, the positional information transmitters 100 are disposed on the ceiling in the form of a matrix. Hereinafter, as shown in FIG. 9, a space defined by a rectangular parallele piped having four positional information transmitters 100a to 100d as vertexes is referred to as a "unit space", and a floor face, which is one of six faces forming the rectangular parallele piped, is referred to as a "unit area". Each of the positional information transmitters 100a to 100d shown in FIG. 9 has the structure shown in FIG. 7. Among the four infrared LEDs included in each of the positional information transmitters 100a to 100d, one infrared LED provided in an interior of the unit space is used to emit an infrared ray to the unit space having the positional information transmitters 100a to 100d as vertexes. Thus, four infrared rays are respectively emitted from the positional information transmitters 100a to 100d to the unit space, and the same positional information (i.e., positional information to which a plurality of unit spaces are each uniquely assigned) is superimposed on the four infrared rays. As a result, if the mobile terminal 10 is positioned, for example, in the unit space shown in FIG. 9, the mobile terminal 10 receives an infrared ray emitted from at least any one of the positional information transmitters 100a to 100d, thereby specifying the unit space in which the mobile terminal 10 itself is positioned.

Figure 10:
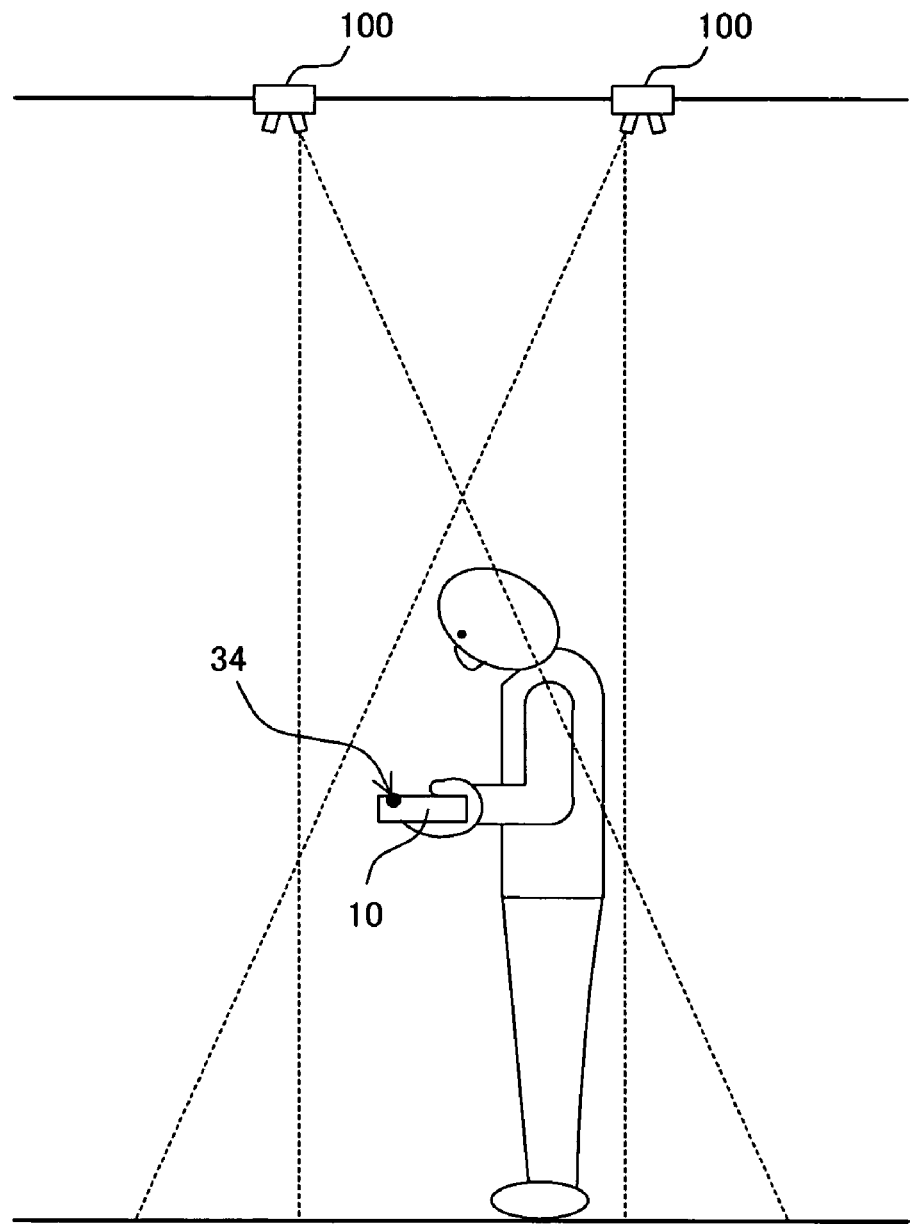
FIG. 10 is a view illustrating the unit space as viewed horizontally therefrom.

Although the present embodiment illustrates an example where, as shown in FIG. 9, the four infrared rays sharing the same positional information are emitted from different directions to the unit space, the present invention is not limited thereto. For example, only one infrared LED may be provided on a center portion of a ceiling face forming each unit space. However, as described in the present embodiment above, it is more preferable that the four infrared rays sharing the same positional information be emitted from different directions to the unit space. In such a configuration, as shown in FIG. 10, even if an infrared ray emitted from one positional information transmitter 100 did not reach the infrared receiving units 34 of the mobile terminal 10 because the infrared ray is interrupted by a head of the user, another infrared ray, having the same positional information as the interrupted infrared ray superimposed thereon, which is emitted from the other positional information transmitter 100, would reach the infrared receiving units 34 of the mobile terminal 10, thereby more accurately specifying the current position of the mobile terminal 10.

Furthermore, although the present embodiment illustrates an example where the positional information transmitters 100 are mounted on the ceiling, the present embodiment is not limited thereto. The positional information transmitters 100 may be mounted on the floor, or on both the ceiling and the floor.

Next, a transmission timing at which the positional information transmitter 100 transmits the positional information will be described.

In the present embodiment, infrared rays amplitude modulated by means of the positional information are emitted from the infrared LEDs. Also, the infrared rays emitted from the infrared LEDs have common frequency bands. Therefore, when a plurality of infrared rays, each of which has different positional information superimposed thereon, simultaneously reach the infrared receiving units 34 of the mobile terminal 10, an error occurs due to interference. Thus, in the present embodiment, in order to prevent such an error caused by the interference, the transmitter control device 400 controls a timing at which each of the infrared LEDs is emitted such that when an infrared ray is emitted to a unit space, infrared rays for adjacent unit spaces are not emitted.

Hereinafter, with reference to FIGS. 11 to 14, a control, executed by the transmitter control device 400, of a timing at which each of the infrared LEDs is emitted, will be described in detail. FIGS. 11 to 14 illustrate environments as viewed from over the positional information transmitters 100. Four circles, shown by dot-dash lines, in an interior of each of the positional information transmitters 100 represent the infrared LEDs, and a black circle among the four circles represents the infrared LED transmitting the positional information.

Figure 11:
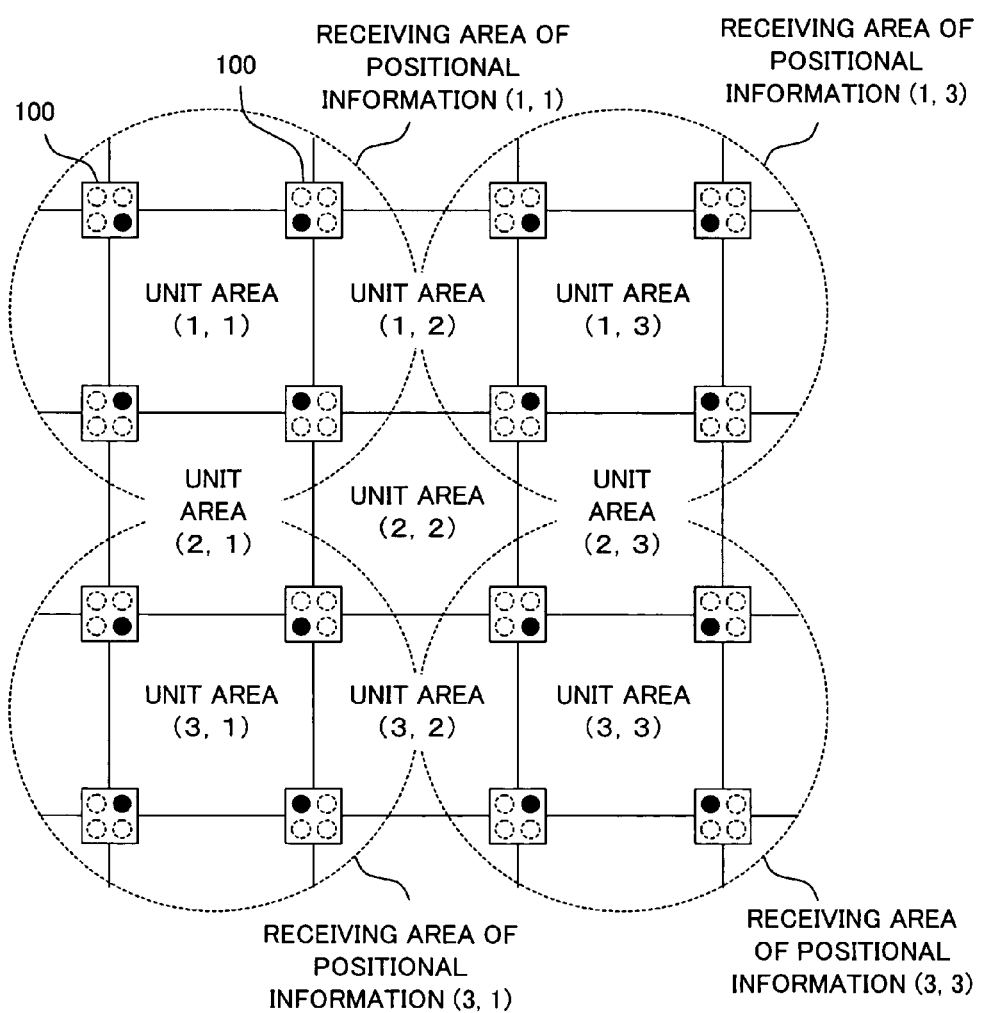
FIG. 11 is a view used for explaining a timing at which an infrared LED is emitted.
Figure 12:
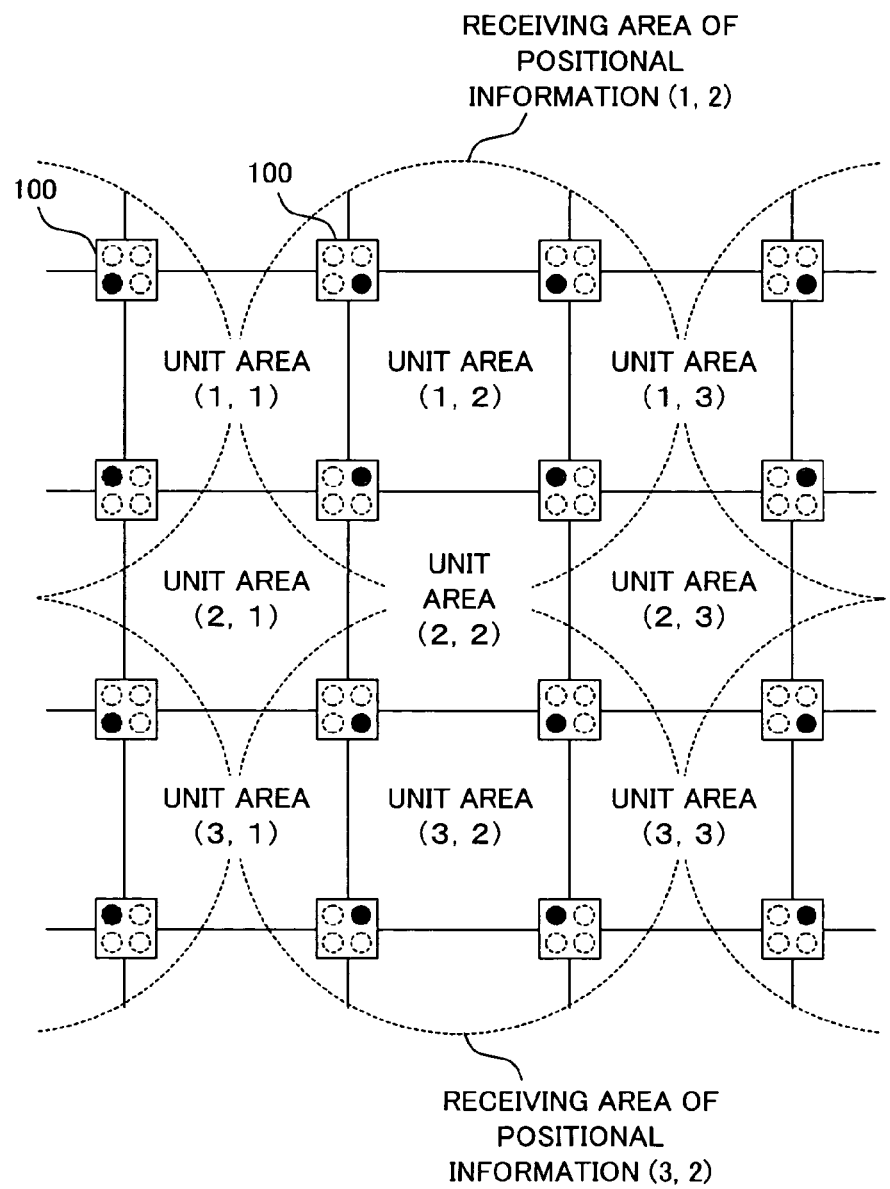
FIG. 12 is a view used for explaining another timing at which an infrared LED is emitted.
Figure 13:
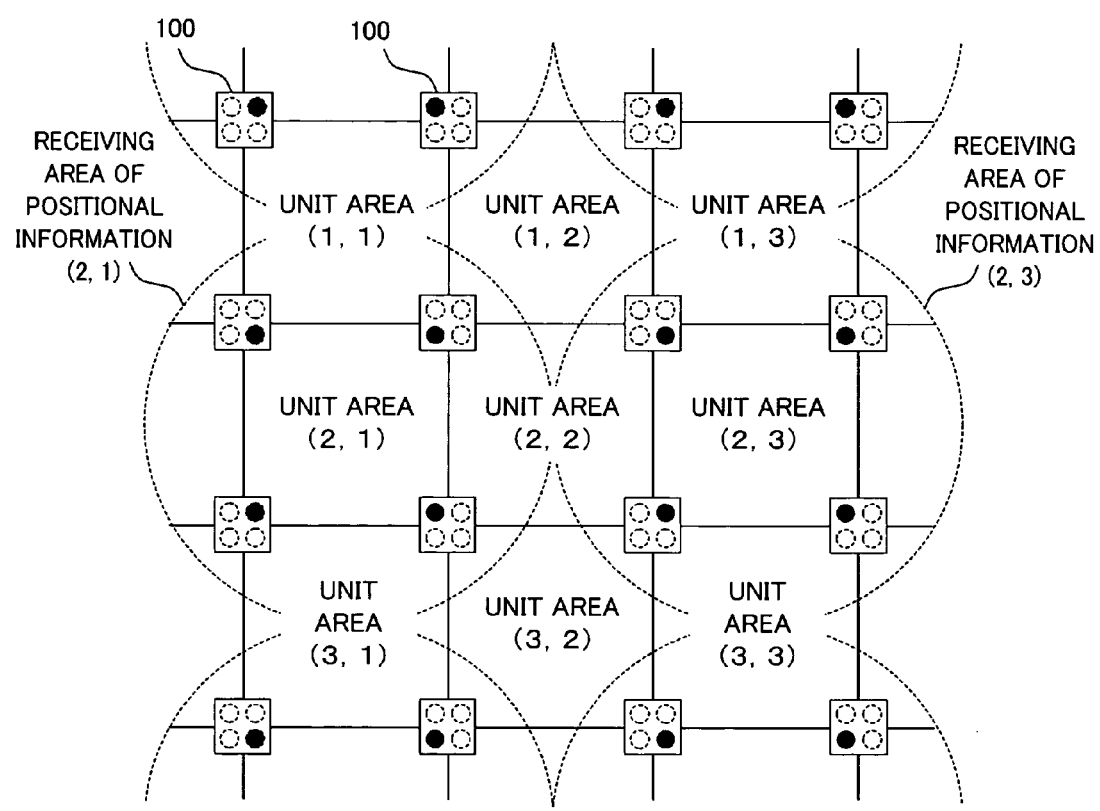
FIG. 13 is a view used for explaining still another timing at which an infrared LED is emitted.
Figure 14:
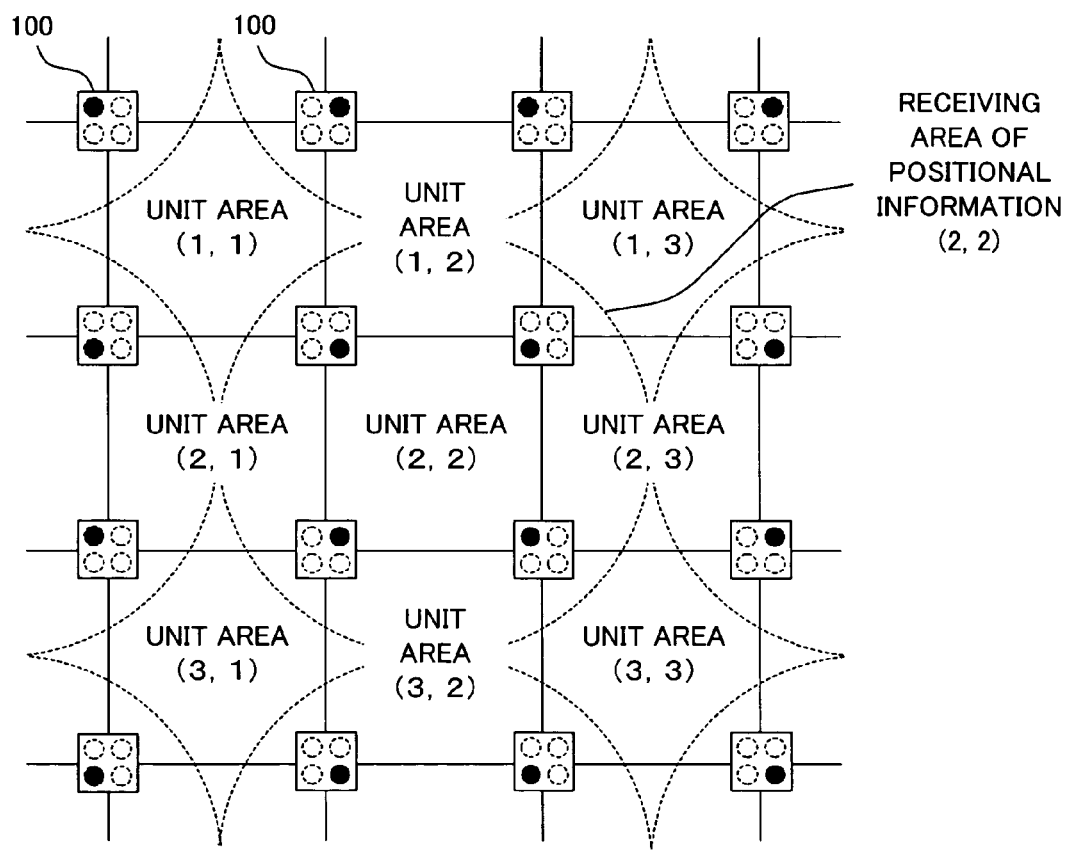
FIG. 14 is a view used for explaining still another timing at which an infrared LED is emitted.

In the present embodiment, the transmitter control device 400 causes the infrared LEDs represented by black circles shown in FIG. 11 to emit infrared rays during a first period of 25 m, causes the infrared LEDs represented by black circles shown in FIG. 12 to emit infrared rays during a second period of 25 ms, causes the infrared LEDs represented by black circles shown in FIG. 13 to emit infrared rays during a third period of 25 ms, and causes the infrared LEDs represented by black circles shown in FIG. 14 to emit infrared rays during a fourth period of 25 ms. Thereafter, the transmitter control device 400 repeats a control in a similar manner to that described above. Specifically, when n and m are integers, positional information (1+2n, 1+2m) is transmitted to a unit area (1+2n, 1+2m) during the first period of 25 ms, positional information (1+2n, 2+2m) is transmitted to a unit area (1+2n, 2+2m) during the second period of 25 ms, positional information (2+2n, 1+2m) is transmitted to a unit area (2+2n, 1+2m) during the third period of 25 ms, and positional information (2+2n, 2+2m) is transmitted to a unit area (2+2n, 2+2m) during the fourth period of 25 ms. As such, four pieces of the positional information are transmitted at an interval of 100 ms.

In FIG. 11, the infrared rays containing four pieces of positional information (1, 1), (1, 3), (3, 1) and (3, 3) are emitted to unit areas (1, 1), (1, 3), (3, 1) and (3, 3), respectively. Here, the infrared ray containing the positional information (1, 1) is emitted not only to the unit area (1, 1) but also to a portion of unit areas adjacent to the unit area (1, 1). However, in the present embodiment, the current position of the mobile terminal 10 is determined, as described below, based on a receiving frequency of each piece of the positional information. Thus, it is possible to determine the current position of the mobile terminal 10 even if the infrared ray is emitted, in addition to a unit area, to portions of other unit areas adjacent to the unit area. An emission range of the infrared ray containing the positional information (1, 1) may be a range which covers an entirety of the unit area (1, 1) and is not overlapped with an emission range of a simultaneously emitted infrared ray containing the positional information other than the positional information (1, 1). The same is also true of other emission ranges of infrared rays containing other pieces of the positional information.

Figure 15:
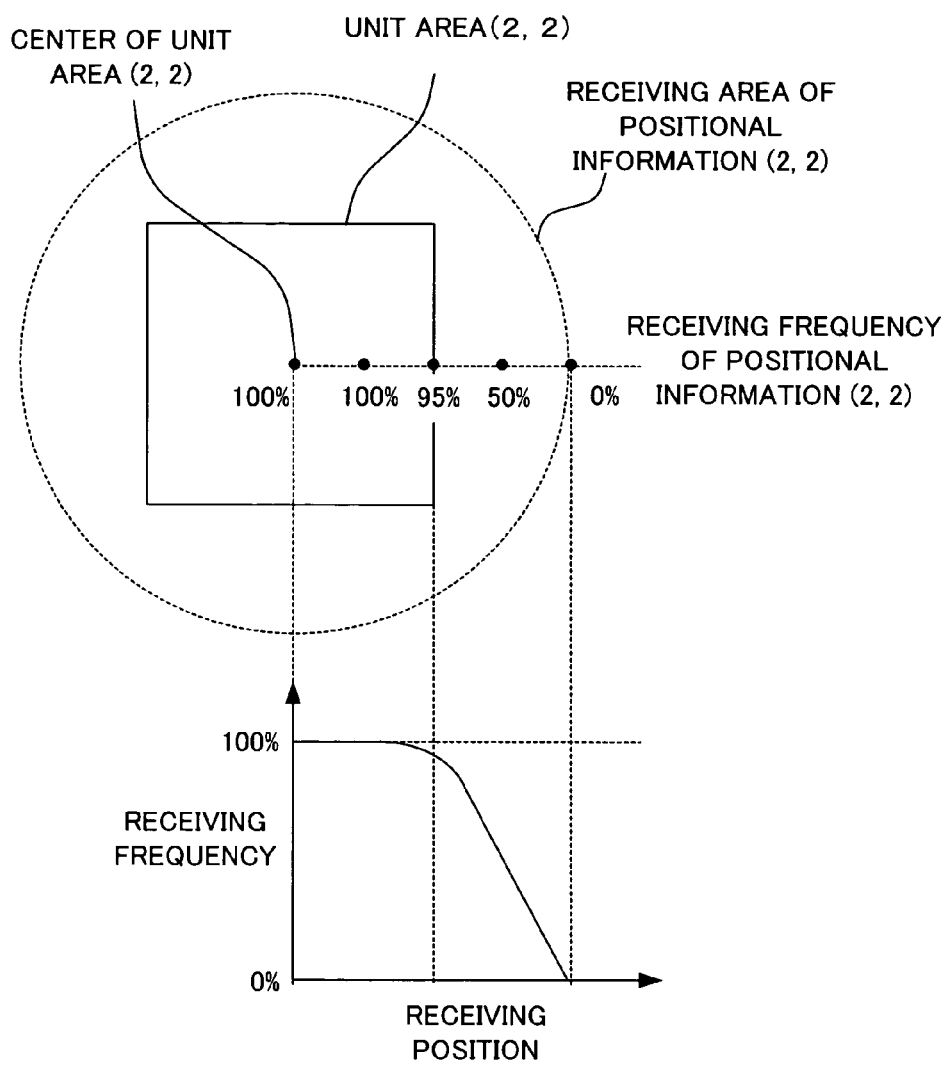
FIG. 15 is a view illustrating a relationship between a receiving position of the positional information and a receiving frequency of the positional information.

Next, with reference to FIG. 15, the receiving frequency of the positional information will be described. FIG. 15 is a view showing how a receiving frequency (i.e., a ratio of the number of times an infrared ray is successfully received to a total number of times the infrared ray is emitted) of the positional information (2, 2) changes in accordance with a position, of the mobile terminal 10, at which the infrared ray is received, when an infrared ray having positional information (2, 2) superimposed thereon is emitted to a unit area (2, 2) for a plurality of times. Note that characteristics of the receiving frequency depend on a type of the infrared LED, a structure of the positional information transmitter 100, performance quality of the infrared receiving unit 34, a mounting position of the infrared receiving unit 34, or the like. Generally speaking, however, there is a tendency, as shown in FIG. 15, that the farther away from a center of the unit area (2, 2) a position at which the infrared ray is received is, the lower the receiving frequency of the positional information (2, 2) becomes.

As described above, there is a tendency that the farther away from a center of a unit area a position at which an infrared ray is received is, the lower a receiving frequency of the positional information corresponding the unit area becomes. Thus, in the case where the mobile terminal 10 receives a plurality of pieces of the positional information, the mobile terminal 10 compares receiving frequencies of the plurality of pieces of the positional information with each other, thereby specifying the current position of the mobile terminal 10. For example, during a certain period, it is assumed that various pieces of positional information are transmitted six times, and the mobile terminal 10 receives the positional information (2, 2) six times (i.e., a receiving frequency of the positional information is 100%), and positional information (2, 3) three times (i.e., a receiving frequency of the positional information is 50%). In such a case, it is determined that the mobile terminal 10 is positioned on the unit area (2, 2) corresponding to the positional information which has been most frequently received (i.e., the positional information (2, 2)).

By detecting such a receiving frequency, a position which is more accurately indicated than that indicated by the positional information can be detected. In the above example, the mobile terminal 10 is positioned on the unit area (2, 2), and taking into account that the receiving frequency of the positional information (2, 3) is 50%, it is further determined that the mobile terminal 10 is at a position displaced toward the unit area (2, 3) from the center of the unit area (2, 2). In particular, taking the characteristics of the receiving frequency shown in FIG. 15 into consideration, it is also determined that an amount of the displacement is approximately a length equal to a quarter of that of a side of the unit area.

As one of easy methods for calculating an accurate current position of the mobile terminal 10, there is a method for calculating a weighted average of the positional information (represented by two-dimensional coordinates if not represented by other manners) by dividing a sum of the positional information received by the mobile terminal 10 in accordance with its receiving time (or its receiving frequency). For example, during a certain period, it is assumed that the mobile terminal 10 receives positional information (1, 1) twice, positional information (1, 2) six times, positional information (2, 1) once, and positional information (2, 2) twice. In this case, the following expression: $((1, 1) \times 2+(1, 2) \times 6+(2, 1) \times 1+(2, 2) \times 2)/(2+6+1+2)$ is calculated, thereby obtaining the calculated result (1.3, 1.7) as the current position of the mobile terminal 10. Note that the calculated result (1.3, 1.7) represents, when a length of a side of a unit area is 1, a position displaced 0.3 toward a unit area (2, 1) and 0.7 toward a unit area (1, 2) from a center of a unit area (1, 1).

As described above, the position which is more accurately indicated than that indicated by the positional information is detected for the current position of the mobile terminal 10, thereby reducing the number of the positional information transmitters 100 required for achieving a desired precision for position detection. Thus, it becomes possible to decrease a cost of the position detecting system.

Next, with reference to FIGS. 16 to 22, an exemplary transition of images displayed on the first LCD 11 and the second LCD 12, and an exemplary transition of images displayed on the floor displays 200, for when the user carrying the mobile terminal 10 moves on the floor displays 200, will be described.

Figure 20:
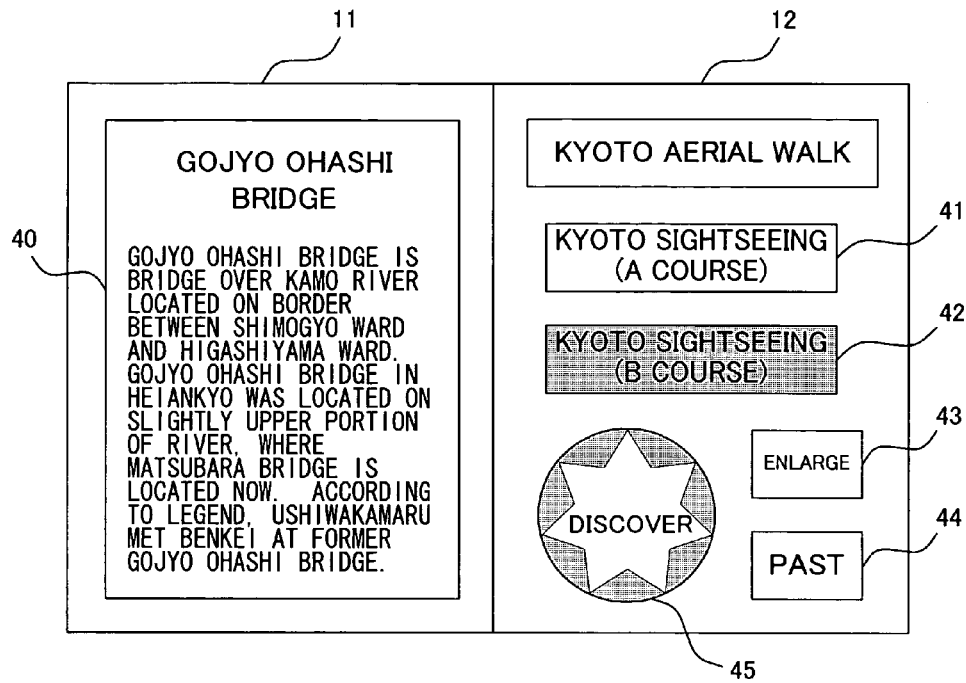
FIG. 20 shows still another exemplary terminal-side image.

FIG. 16 shows an initial image displayed on the first LCD 11 and the second LCD 12 of the mobile terminal 10. Hereinafter, in order to facilitate the understanding of the following description, an image displayed on the first LCD 11 and an image displayed on the second LCD 12 are generically referred to as a "terminal-side image". The terminal-side image includes a description display field 40, an "A course" selecting button 41, a "B course" selecting button 42, an "enlarge" button 43, a "past" button 44, and a "discover" button 45. The user touches one of the buttons (more accurately, an area, on a screen of the second LCD 12, in which one of the buttons is displayed) displayed on the second LCD panel 12 via the touch panel 15 so as to input an instruction in accordance with the button. Note that the "discover" button 45 is a unique button which is only selectable in a specific situation. In the initial terminal-side image, the "discover" image 45 is non-selectable. Furthermore, in order to clearly recognize whether the "discover" button 45 is selectable or non-selectable, a display mode of the "discover" button 45 changes between when the "discover" button 45 is selective and when the "discover" button 45 is non-selective. For example, in a situation where the "discover" button 45 is selectable, the "discover" button 45 is displayed, as shown in FIG. 20, in a normal manner. On the other hand, in a situation where the "discover" button 45 is non-selectable, the "discover" button 45 is, as shown in FIG. 16, grayed out. Although the present embodiment illustrates an example where the touch panel 15 is used to select a button, the present invention is not limited thereto. Other input devices (e.g., the operation switch unit 14) may be used to select a button.

On the other hand, a map image of a certain region ("Kyoto" in the present embodiment) is displayed on an entirety of the plurality of floor displays 200 as an initial image. The map image is generated by combining a satellite image of the region, which is captured by a satellite, with images of a vehicle, a human and a bird, which are all generated by computer graphics. The images of the vehicle, the human and the bird are animated so as to be displayed as if they were actually moving. By walking on the plurality of floor displays 200 displaying such a map image, the user can have a special feeling as if he or she were actually walking over the region, thereby causing the user to experience a novel sensation. Hereinafter, in order to facilitate the understanding of the following description, an image displayed on the plurality of floor images 200 is generically referred to as a "floor image".

Figure 18:
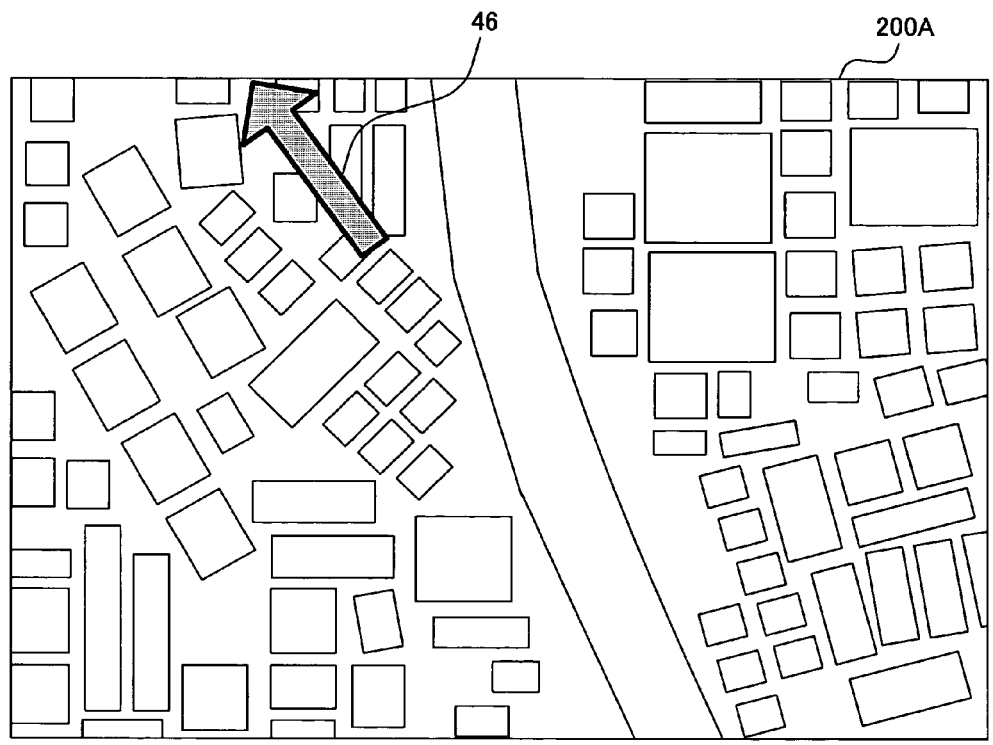
FIG. 18 shows an exemplary floor image including an arrow 46.

FIG. 17 shows the terminal-side image immediately after the user touches with the stick 16 the "A course" selecting button 41 displayed on the initial image shown in FIG. 16. When the user touches the "A course" selecting button 41, a description text indicating that the user is started to be guided along an "A course" is displayed on the description display field 40, and the "B course" selecting button 42 is grayed out. On the other hand, as shown in FIG. 18, an image combining the map image with an arrow 46 indicating a direction of a destination is displayed on the floor display 200A on which the user stands. The user moves in accordance with the arrow 46, thereby sequentially visiting a plurality of destinations along a predetermined course ("A course" or "B course"). As described above, the user can virtually travel around a region displayed on the floor displays 200. Hereinafter, such an operation mode, executed by the position detecting system, which guides the user along the "A course" or the "B course" is referred to as a "sightseeing mode".

Figure 19:
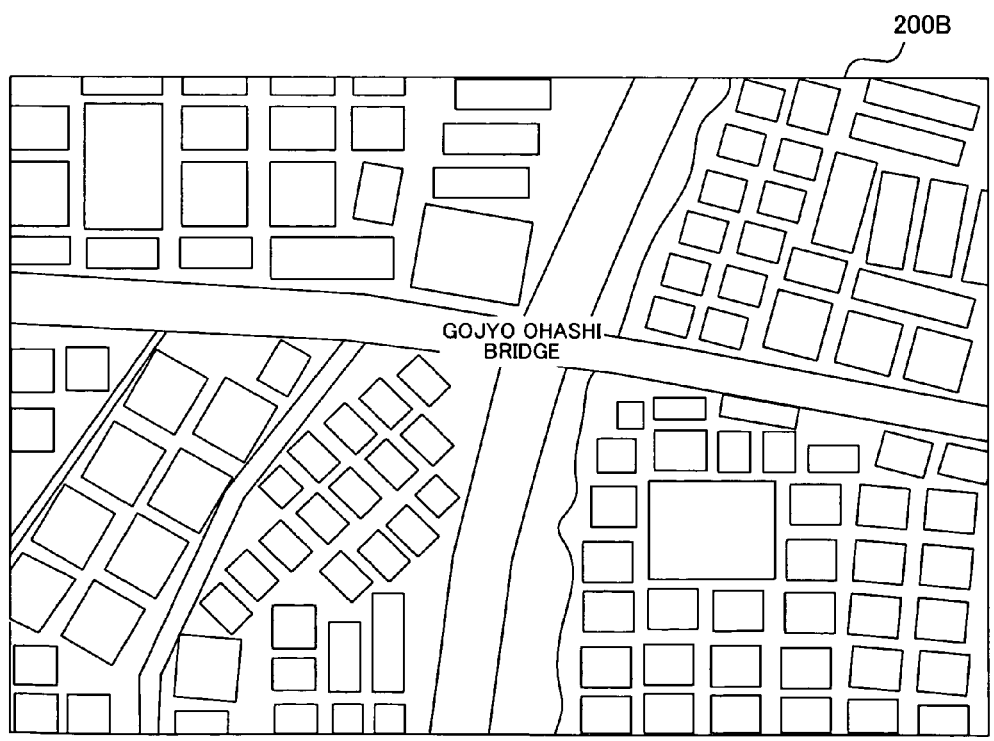
FIG. 19 shows another exemplary floor image.

When the user walks through a plurality of the floor displays 200 from the floor display 200A shown in FIG. 18 and arrives at a floor display 200B, shown in FIG. 19, on which a destination at the present time (e.g., "Gojyo Ohashi Bridge") is displayed, the terminal-side image changes from the image shown in FIG. 17 to an image shown in FIG. 20. The image shown in FIG. 17 is different from the image shown in FIG. 20 in that a description text regarding "Gojyo Ohashi Bridge" is displayed on the description display field 40 in FIG. 20 and the "discover" button 45 is changed from a grayed out state in FIG. 17 to a normal state in FIG. 20. As described above, when the user arrives in a vicinity of a position at which a destination is displayed, a description text regarding the destination is automatically displayed on the description display field 40.

Figure 21:
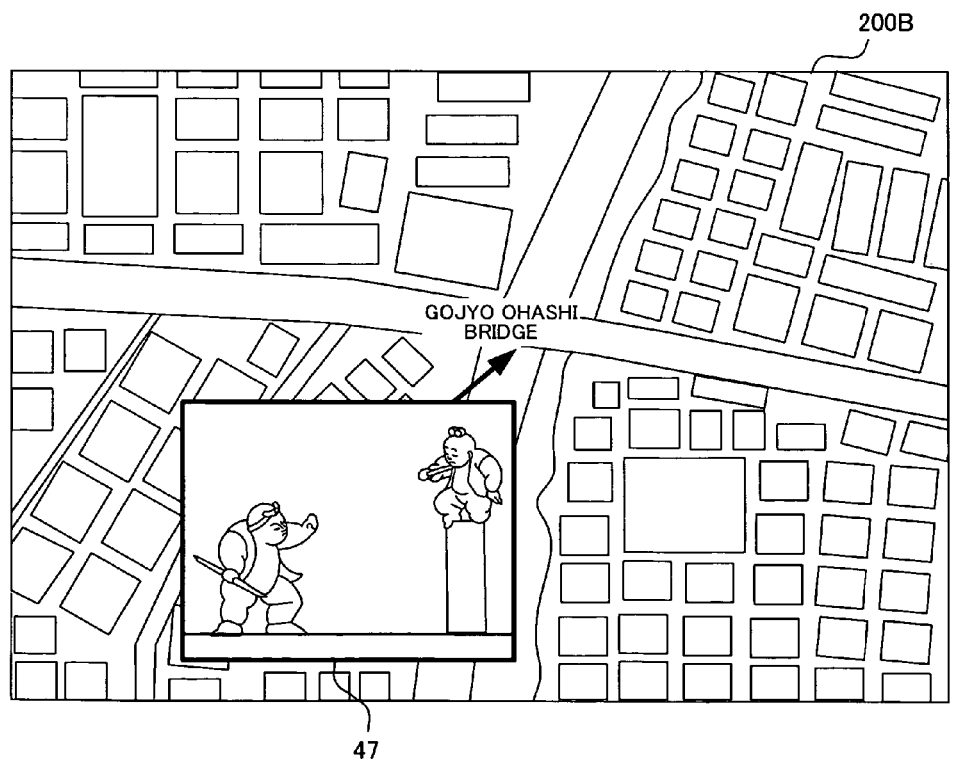
FIG. 21 shows still another exemplary floor image including an event picture 47.

When the user touches the "discover" button 45 while the "discover" button 45 is displayed, as shown in FIG. 20, in a normal manner, an event picture 47 corresponding to a location is displayed, as shown in FIG. 21, on one of the floor displays 200 (i.e., the floor display 200B in the present embodiment) on which the user stands. In an example shown in FIG. 21, a picture of a monument constructed in the vicinity of "Gojyo Ohashi Bridge" is displayed as the event picture 47. Note that such an event picture is also displayed in operation modes other than the sightseeing mode. Locations (e.g., 150) for displaying event pictures are previously determined. When the user comes near one of the locations, the "discover" button 45 changes from the grayed out state to the normal state so as to notify him or her that there is an event picture corresponding to the location. Thus, the user can enjoy walking around while searching for a location at which an event picture is "hidden" as if he or she were searching for a treasure.

Figure 22:
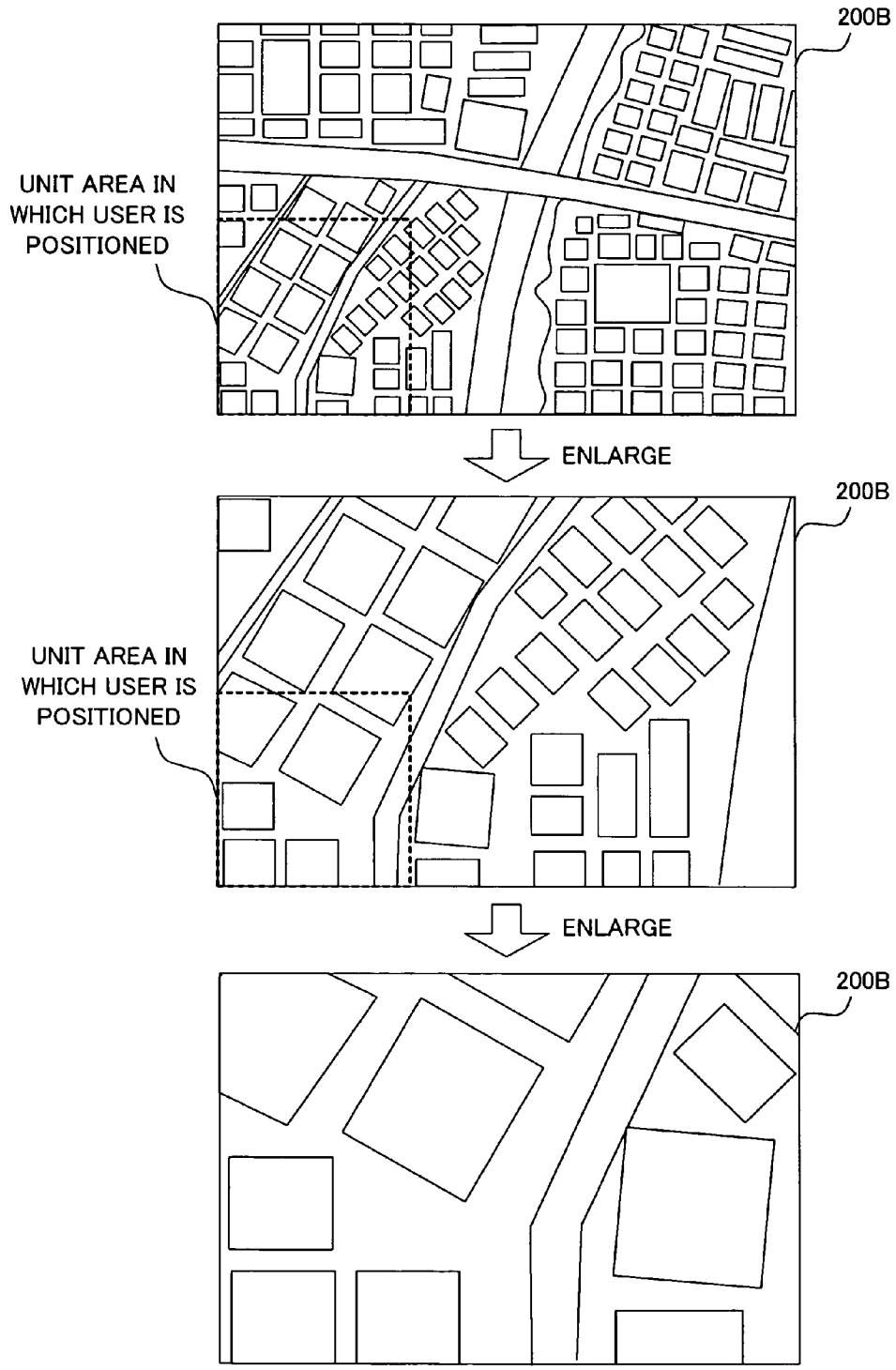
FIG. 22 shows an exemplary transition of floor images enlarged by an image enlargement process.

Irrespective of whether or not an operation mode executed by the position detecting system is the sightseeing mode, when the user moves to a portion of the floor image, displayed on the floor displays 200, where he or she wishes to enlarge the displayed portion thereof, and then touches the "enlarge" button 43 of the mobile terminal 10, the displayed portion of the floor image is to be enlarged. For example, when the user touches the "enlarge" button 43 while standing on the lower-left portion of the floor display 200B, an image displayed on the floor display 200B is enlarged, as shown in FIG. 22, by two times centering on a unit area on which the user is positioned. When the user further touches the "enlarge" button 43, the image of the floor display 200B is further enlarged by two times centering on the unit area on which the user is positioned. As described above, the user can enlarge a portion of the floor image as he or she pleases. Note that in the present embodiment, the floor image is enlarged for each image displayed on one floor display 200. That is, in an example of enlarging the floor image as shown in FIG. 22, the image displayed on the floor display 200B on which the user is positioned is only enlarged, and images displayed on its adjacent floor displays 200 are not enlarged. However, the present invention is not limited to the above-described example. An entire floor image may be enlarged centering on a unit area on which the user is positioned (i.e., images displayed on all of the floor displays 200 may be changed altogether).

When the user pushes the "past" button 44 displayed on the terminal-side image, the map image displayed on one of the floor displays 200 on which the user stands changes to a "past" image, i.e., an illustration showing what a region displayed on the floor displays 200 looked like one thousand and a few hundreds years ago (e.g., "Heiankyo" during the "Heian" Period). Thus, the user can view an illustration showing what a desired region looked like in the past.

Hereinafter, in order to realize the aforementioned transitions of the terminal-side images and the floor images, a process executed by the position detecting system will be described in detail.

Figures 23, 24:
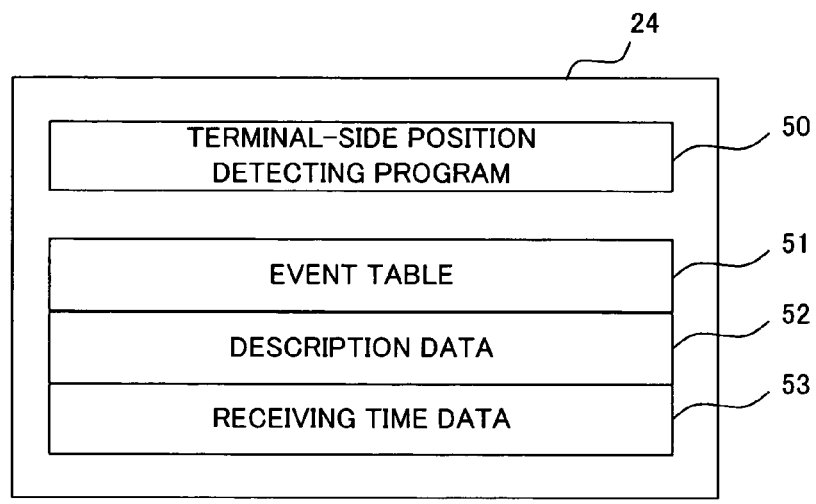
FIG. 23 shows a memory map of a RAM 24 included in the mobile terminal 10.
FIG. 24 shows an exemplary event table 51.

FIG. 23 shows a memory map of the RAM 24 included in the mobile terminal 10. The RAM 24 stores a terminal-side position detecting program 50, an event table 51, description data 52, and receiving time data 53. The terminal-side position detecting program 50 stored in the ROM 17a of the memory card 17 is loaded to the RAM 24, and the terminal-side position detecting program 50 having been loaded to the RAM 24 is executed by the CPU core 21. The event table 51 and the description data 52 stored in the ROM 17a of the memory card 17 is loaded to the RAM 24, and the event table 51 and the description data 52 having been loaded are read by the CPU core 21 as necessary when the terminal-side position detecting program 50 is in operation. The receiving time data 53 is generated and updated by the CPU core 21 when the terminal-side position detecting program 50 is in operation.

Figures 25, 26:
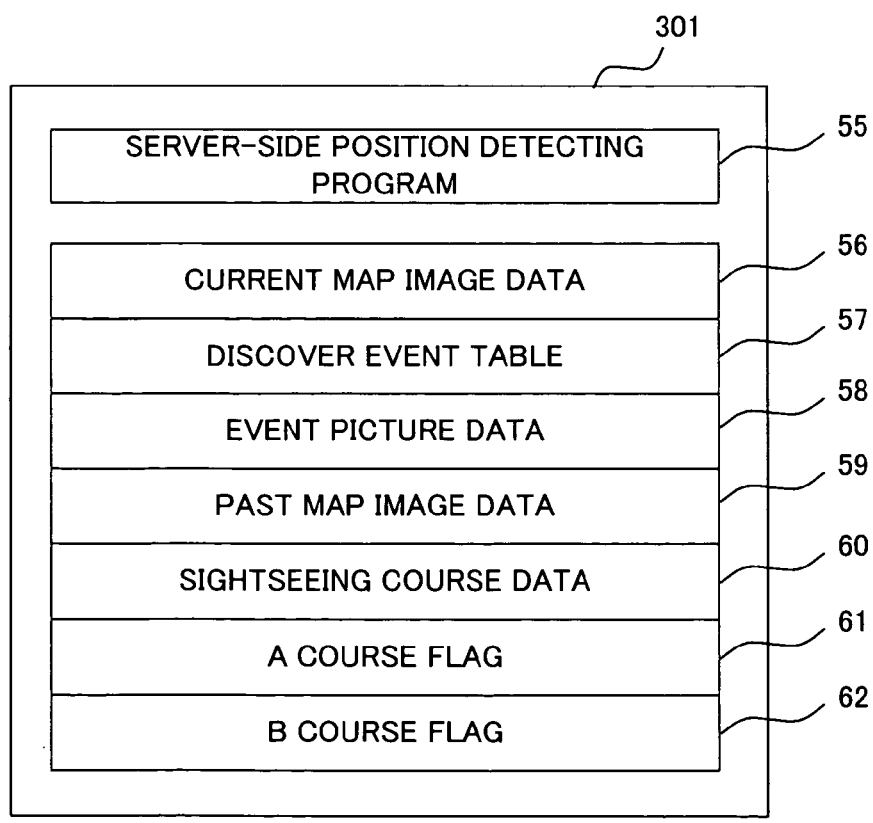
FIG. 25 shows exemplary receiving time data 53.
FIG. 26 shows a memory map of a RAM 301 included in the server 300.

As shown in FIG. 24, the event table 51 shows whether or not each unit area has a "describe" event and a "discover" event. As described above with reference to FIG. 20, the "describe" event automatically displays a description text in the description display field 40. A description text corresponding to each "describe" event is stored in the RAM 24 as the description data 52. As described above with reference to FIG. 21, the "discover" event displays an image on one of the floor displays 200 when the user touches the "discover" button 45. As shown in FIG. 25, the receiving time data 53 stores a receiving time of each piece of the positional information.

FIG. 26 shows a memory map of the RAM 301 included in the server 300. The RAM 301 stores a server-side position detecting program 55, current map image data 56, a "discover" event table 57, event picture data 58, "past" map image data 59, sightseeing course data 60, an "A course" flag 61, and a "B course" flag 62. The server-side position detecting program 55 stored in the hard disk 304 is loaded to the RAM 301, and the server-side position detecting program 55 having been loaded is executed by the CPU 302. The current map image data 56, the "discover" event table 57, the event picture data 58, the "past" map image data 59, and the sightseeing course data 60, which are all stored in the hard disk 304, are loaded to the RAM 301 when the server-side position detecting program 55 is in operation, and read by the CPU 302 as necessary. The "A course" flag 61 and the "B course" flag 62 are generated and updated by the CPU 302 when the server-side position detecting program 55 is in operation.

The current map image data 56 represents map image data shown in FIG. 18, for example. As shown in FIG. 27, the "discover" event table 57 shows a unit area and picture data, included in the event picture data 58, which corresponds thereto. The event picture data 58 represents data of the event picture 47 shown in FIG. 21, for example. The "past" map image data 59 represents "past" image data displayed when the user touches the "past" button 44. As shown in FIG. 28, the sightseeing course data 60 includes coordinates indicating a position of a traveling spot (i.e., a destination) in each of the "A course" and the "B course", and an arrival flag showing whether the user arrives at the destination. The arrival flag shows whether or not the user visits the destination.

Figure 29:
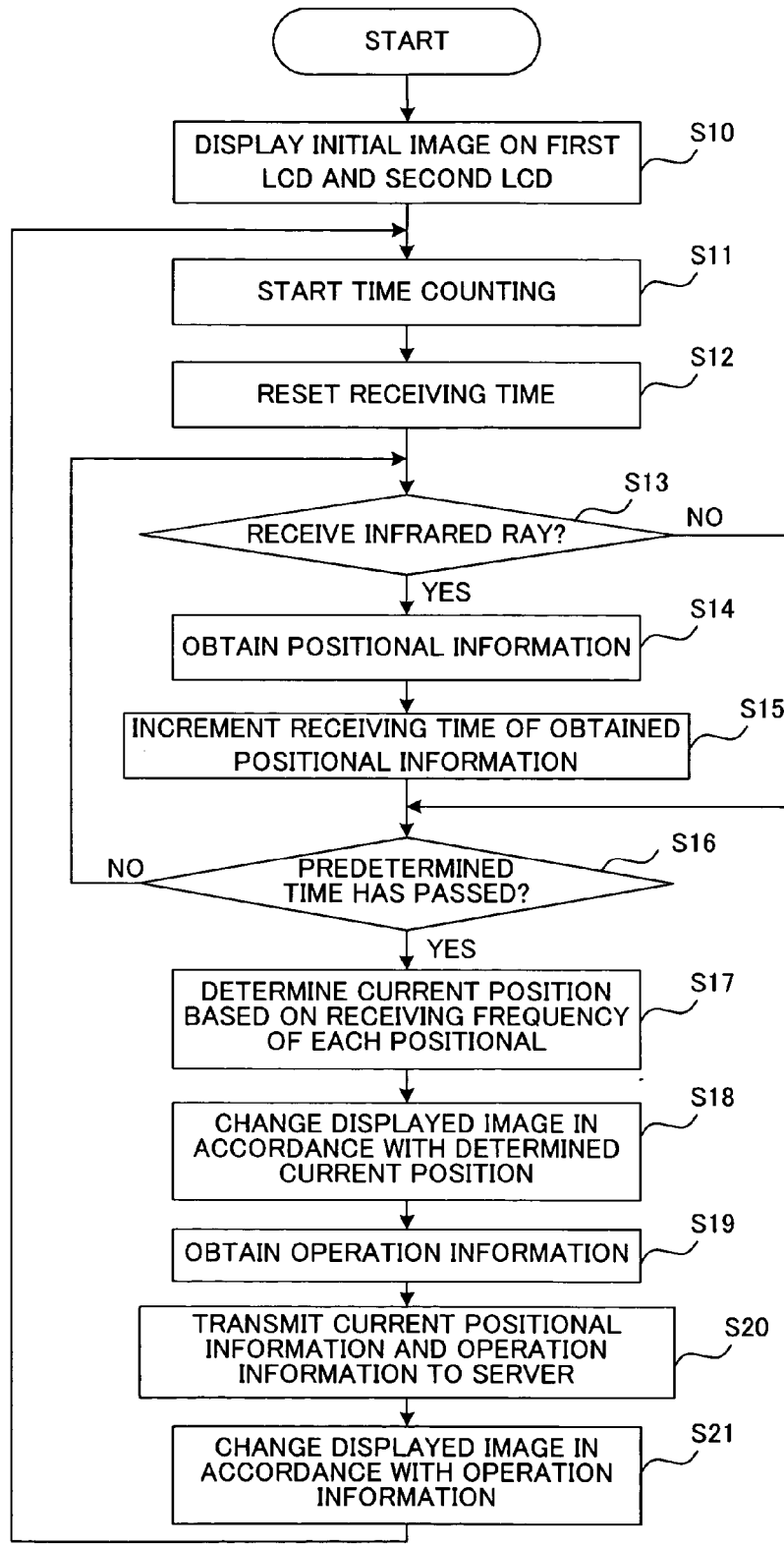
FIG. 29 is a flowchart illustrating a flow of a process executed by a CPU core 20 of the mobile terminal 10.

Next, with reference to a flowchart of FIG. 29, a flow of a process executed by the CPU core 21 based on the terminal-side position detecting program 50 will be described.

Firstly, in step S10, the CPU core 21 displays the initial image shown in FIG. 16 on the first LCD 11 and the second LCD 12 which are included in the mobile terminal 10.

In step S11, a time count is started.

In step S12, a receiving time, of each piece of the positional information, stored in the receiving time data 53 shown in FIG. 25 is reset to zero.

In step S13, it is determined whether either of the infrared receiving units 34 has received an infrared ray from any of the positional information transmitters 100. If either of the infrared receiving units 34 has received an infrared ray, the process proceeds to step S14. On the other hand, if none of the infrared receiving units 34 has received an infrared ray, the process proceeds to step S16.

In step S14, the positional information is obtained from the received infrared ray.

In step S15, the receiving time data 53 is updated by incrementing a receiving time of the obtained positional information.

In step S16, it is determined whether a predetermined time (e.g., 200 ms) has passed since the time count is started in step S11. If the predetermined time has passed, the process proceeds to step S17. On the other hand, if the predetermined time has not yet passed, the process returns to step S13. Note that the predetermined time corresponds to a time period required for measuring a receiving frequency of each piece of the positional information. If the predetermined time is set short, a detection interval of the current position of the mobile terminal 10 becomes shorter, and a detection precision of the current position of the mobile terminal 10 becomes lower. On the other hand, if the predetermined time is set long, the detection interval of the current position of the mobile terminal 10 becomes longer, and the detection precision of the current position of the mobile terminal 10 becomes higher. Therefore, the predetermined time should be set at an optimum value depending on purpose.

In step S17, with reference to the receiving time data 53, the current position of the mobile terminal 10 is determined based on a receiving frequency of each piece of the positional information. Although the present embodiment illustrates an example where it is determined that the mobile terminal 10 is positioned on a unit area corresponding to a piece of the positional information which has been most frequently received, the present invention is not limited thereto. As described above, the current position of the mobile terminal 10 may be determined at a position which is more accurately indicated than that indicated by the positional information.

In step S18, in accordance with the current position of the mobile terminal 10 determined in step S17, the image displayed on the first LCD 11 or the second LCD 12 is changed. Specifically, with reference to the event table 51, it is determined whether there is a "describe" event or a "discover" event, which corresponds to the current position of the mobile terminal 10 determined in step S17. If there is a "describe" event, a description text is displayed in the description display field 40 based on the description data 52 corresponding to the "describe" event. Also, if there is a "discover" event, a display mode of the "discover" button 45 is changed.

In step S19, an instruction inputted by the user via the touch panel 15 or the operation switch unit 14 is obtained as operation information. In the present embodiment, any of an "A course" selecting instruction inputted by touching the "A course" selecting button 41, a "B course" selecting instruction inputted by touching the "B course" selecting button 42, an enlargement instruction inputted by touching the "enlarge" button 43, a "past" image display instruction inputted by touching the "past" button 44, and a "discover" event display instruction inputted by touching the "discover" button 45 is obtained as the operation information. If no instruction is inputted by the user, the process proceeds to step S20 without obtaining the operation information.

In step S20, current positional information indicating the current position, of the mobile terminal 10, determined in step S17 and the operation information obtained in step S19 are transmitted to the server 300 via the wireless communication unit 33. If no operation information is obtained in step S19, only the current positional information is transmitted to the server 300. Note that identification information of the mobile terminal 10 may be additionally transmitted, in step S20, to the server 300 as necessary. If there are the plurality of mobile terminals 10, the identification information of the mobile terminals 10 allows the server 300 to respectively recognize a current position of each of the mobile terminals 10. For example, users each carrying the mobile terminal 10 can be respectively guided along the "A course" or the "B course". In order to realize the above example, groups of arrival flags stored in the sightseeing course data 60, shown in FIG. 28, may be grouped for each of the mobile terminals 10 such that the server 300 respectively determines traveling spots for each of the mobile terminals 10.

In step S21, the terminal-side image is changed in accordance with the operation information obtained in step S19 (e.g., the "B course" selecting button 42 is grayed out as shown in FIG. 17).

After step S21, the process returns to step S11.

Although the present embodiment described above illustrates an example where the current position of the mobile terminal 10 is determined each time the predetermined time passes, and then the current positional information indicating the current position of the mobile terminal 10 is transmitted to the server 300, the present embodiment is not limited thereto. For example, the current position of the mobile terminal 10 may be determined each time a total receiving time of the positional information reaches a predetermined time, and then current positional information indicating the current position of the mobile terminal 10 may be transmitted to the server 300. Alternatively, the current position of the mobile terminal 10 may be determined, each time the mobile terminal 10 receives any piece of the positional information, based on eight pieces of the positional information which have been most recently received, and then current positional information indicating the current position of the mobile terminal 10 may be transmitted to the server 300.

Next, with reference to a flowchart of FIG. 30, a flow of a process executed by the CPU 302 based on the server-side position detecting program 55 will be described.

Firstly, in step S30, the CPU 302 displays the map image on each of the floor displays 200 based on the current map image data 56.

In step S31, it is determined whether the current positional information has been received from the mobile terminal 10 via the wireless communication unit 303. If the current positional information has been received, the process proceeds step S32. On the other hand, if no current positional information has been received, step S31 is repeated until any of the positional information is received.

In step S32, it is determined whether the operation information has been received from the mobile terminal 10. If the operation information has been received, the process proceeds to step S33. On the other hand, if no operation information has been received, the process proceeds to step S42.

In step S33, it is determined whether the operation information represents the "A course" selecting instruction. If the operation information represents the "A course" selecting instruction, the process proceeds to step S34. On the other hand, if the operation information does not represent the "A course" selecting instruction, the process proceeds to step S35.

In step S34, the "A course" flag 61 is turned on. Thereafter, the process proceeds to step S42.

In step S35, it is determined whether the operation information represents the "B course" selecting instruction. If the operation information represents the "B course" selecting instruction, the process proceeds to step S36. On the other hand, if the operation information does not represent the "B course" selecting instruction, the process proceeds to step S37.

In step S36, the "B course" flag 62 is turned on. Thereafter, the process proceeds to step S42.

In step S37, it is determined whether the operation information represents the enlargement instruction. If the operation information represents the enlargement instruction, the process proceeds to step S38. On the other hand, if the operation information does not represent the enlargement instruction, the process proceeds to step S39.

In step S38, based on the current positional information received from the mobile terminal 10, an image, displayed on the floor display 200, which corresponds to the current positional information is enlarged, as shown in FIG. 22, centering on the current position of the mobile terminal 10. Thereafter, the process proceeds to step S42. Note that in the example shown in FIG. 22, an image is enlarged centering on a unit area on which the user (i.e., the mobile terminal 10) is positioned. However, in the case where the current positional information received from the mobile terminal 10 indicates a position which is more accurately indicated than that indicated by the unit area such as a point within the unit area, the image may be enlarged centering on the point.

In step S39, it is determined whether the operation information represents the "past" image display instruction. If the operation information represents the "past" image display instruction, the process proceeds to step S40. On the other hand, if the operation information does not represent the "past" image display instruction (i.e., the operation information represents the event picture display instruction), the process proceeds to step S41.

In step S40, based on the current positional information received from the mobile terminal 10 and the "past" map image data 59, a corresponding image displayed on the floor display 200 is changed from the current map image to the "past" map image. Thereafter, the process proceeds to step S42.

In step S41, based on the current positional information received from the mobile terminal 10, the "discover" event table 57 and the event picture data 58, the event picture 47 shown in FIG. 21, for example, is displayed on a corresponding floor display 200. Thereafter, the process proceeds to step S42.

In step S42, it is determined whether the operation mode of the server 300 communicating with the mobile terminal 10 is the sightseeing mode. Specifically, when either of the "A course" flag 61 or the "B course" flag 62 is on, it is determined that the operation mode is the sightseeing mode. Whereas, when both of the "A course" flag 61 and the "B course" flag are off, it is determined that the operation mode is not the sightseeing mode. If the operation mode of the server 300 is the sightseeing mode, the process proceeds to step S43. On the other hand, if the operation mode of the server 300 is not the sightseeing mode, the process returns to step S31.

In step S43, with reference to the current positional information received from the mobile terminal 10 and the sightseeing course data 60, it is determined whether the mobile terminal 10 has arrived at a destination. For example, it is assumed that the mobile terminal 10 is sequentially guided to a destination A, a destination B, and a destination C along the "A course". When the mobile terminal 10 is to be guided to the destination C from the destination B, the current positional information of the mobile terminal 10 is compared, based on the sightseeing course data 60, with coordinates (Xc, Yc) indicating a position of the destination C, thereby determining whether the mobile terminal 10 has arrived at the destination C. If the mobile terminal 10 has arrived at the destination, the process proceeds to step S44. On the other hand, if the mobile terminal 10 has not yet arrived at the destination, the process proceeds to step S45.

In step S44, an arrival flag corresponding to the destination at which the mobile terminal 10 has arrived is turned on.

In step S45, based on coordinates indicating positions of destinations shown in the sightseeing course data 60, the arrow 46 indicating, as shown in FIG. 18, a direction of one of the destinations is combined with the map image displayed on the floor display 200 corresponding to the current positional information received from the mobile terminal 10.

After step S45, the process returns to step S31. Note that the image enlarged in step S38 and the "past" image changed in step S40 may be displayed only for a constant period of time so a store turn to original images after a predetermined time passes.

As described above, according to the present embodiment, the image displayed on the first LCD 11 or the second LCD 12 of the mobile terminal 10 is automatically changed in accordance with a current position of the mobile terminal 10. Furthermore, when the user inputs an instruction via the touch panel 15, the map image displayed on one of the floor displays 200 on which the user stands is changed in accordance with the inputted instruction. Thus, according to the present embodiment, it becomes possible to provide a highly interesting and novel position detecting system.

Although the present embodiment illustrates an example where the positional information is transmitted from the positional information transmitters 100 by means of infrared rays, the present embodiment is not limited thereto. The positional information may be transmitted by signals other than the infrared rays. Furthermore, in the present embodiment, wireless communication is used between the mobile terminal 10 and the server 300. However, instead of the wireless communication, a communication cable may be used for communicating between the mobile terminal 10 and the server 300.

Although the present embodiment illustrates an example where a plurality of infrared rays are transmitted from each of the positional information transmitters 100 at an interval consisting of four phases shown in FIGS. 11 to 14, in order to prevent interference between the infrared rays transmitted from the positional information transmitters 100, the present embodiment is not limited thereto. For example, in the case where a diameter of a receiving area of each piece of the positional information is in a range from two to three times as long as a length of a side of a unit area, the infrared rays may be transmitted from each of the positional information transmitters 100 at an interval consisting of nine phases; i.e., the nine phases including, when n and m are integers, a first phase for transmitting positional information (0+3m, 0+3n), a second phase for transmitting positional information (0+3m, 1+3n), a third phase for transmitting positional information (0+3m, 2+3n), a fourth phase for transmitting positional information (1+3m, 0+3n), a fifth phase for transmitting positional information (1+3m, 1+3n), a sixth phase for transmitting (1+3m, 2+3n), a seventh phase for transmitting (2+3m, 0+3n), an eighth phase for transmitting (2+3m, 1+3n), and a ninth phase for transmitting (2+3m, 2+3n).

In the present embodiment described above, a transmission timing of a piece of the positional information transmitted to a unit area and a transmission timing of another piece of the positional information transmitted to an adjacent unit area are shifted from each other. Alternatively, in order to prevent interference between infrared rays transmitted from the positional information transmitters 100, a frequency band of an infrared ray transmitted to a unit area may be set so as to be different from that of another infrared ray transmitted to its adjacent unit area. In the above case, the mobile terminal 10 has a function of simultaneously receiving a plurality of infrared rays having different communication bands from each other, thereby making it possible to prevent a receiving error of an infrared ray from occurring due to the interference of the infrared rays, without shifting a transmission timing at which a piece of the positional information is transmitted to a unit area from that at which another piece of the positional information is transmitted to an adjacent unit area.

Furthermore, although the present embodiment illustrates an example where the positional information is transmitted from the positional information transmitters 100, the present embodiment is not limited thereto. When necessary, information other than the positional information may be additionally transmitted as additional information. For example, any information outputted from the server 300 may be transmitted to each of the positional information transmitters 100 via the transmitter control device 400, and then each of the positional information transmitters 100 may transmit the information, as additional information, together with the positional information.

Although the present embodiment illustrates an example where the map image is displayed on the entirety of the floor displays 200, the present embodiment is not limited thereto. Hereinafter, several other variants of the present embodiment will be described.

(First Variant)

In a first variant of the present embodiment, a virtual pond is displayed on the entirety of the plurality of floor displays 200. An image of the pond displayed on the floor displays 200 is generated by computer graphics. There are a school of fish in the pond, and the CPU 302 of the server 300 controls a movement of each of the fish. Specifically, the movements of the fish are controlled so as to swim away when a user carrying the mobile terminal 10 comes close to the fish. The CPU 302 can determine whether the user comes close to a fish by comparing the current positional information transmitted from the mobile terminal 10 with a current position of the fish. Note that a fish swims away so as to move away from the user. For example, when the user moves from a unit area (1, 0) to a unit area (1, 1) while a fish is displayed in the unit area (1, 1), the CPU 302 which detects the user moving from the unit area (1, 0) to the unit area (1, 1) causes the fish to move from the unit area (1, 1) to a unit area (1, 2).

Furthermore, a "bait" button is displayed on the second LCD 12 of the mobile terminal 10. When the user touches the "bait" button, a fish comes close to the user's feet. Specifically, when the CPU 302 detects the "bait" button touched by the user based on the operation information transmitted from the mobile terminal 10, the CPU 302 causes a fish to move to a position corresponding to the current positional information transmitted from the mobile terminal 10.

Still furthermore, a specific area (e.g., a unit area (2, 2)) on the pond has a lotus leaf floated thereon, and there are a group of frogs on the lotus leaf. When the user carrying the mobile terminal 10 moves to the unit area (2, 2), the CPU core 21 of the mobile terminal 10 outputs a song (e.g., "frog song") from the right and left speakers 30a and 30b included in the mobile terminal 10. Whether the user carrying the mobile terminal 10 moves to the unit area (2, 2) can be determined based on the positional information transmitted from the positional information transmitters 100. Note that each of the positional information transmitters 100 transmits, in addition to the positional information, a song output starting signal at an interval of a constant period of time. The song output starting signal is transmitted at the interval of the period of time corresponding to two bars of the song outputted by the CPU core 21. When the user carrying the mobile terminal 10 moves to the unit area (2, 2), and then the mobile terminal 10 receives the song output starting signal from one of the positional information transmitters 100, the CPU core 21 starts to output the aforementioned song. As a result, for example, when two or more users, each of which carries the mobile terminal 10, are gathered on the unit area (2, 2) at different timings, the songs are outputted from the mobile terminals 10 so as to be shifted from each other by an integral multiple of the period of time corresponding to the two bars of the song. Thus, it becomes possible to obtain an interesting effect that the plurality of mobile terminals 10 on the unit area (2, 2) "troll" the song.

Still furthermore, a "ripple" button is displayed on the second LCD 12 of the mobile terminal 10. When the user touches the "ripple" button, a display control is performed such that a ripple spreads, from the user's feet, across a water surface displayed on the entirety of the floor displays 200.

(Second Variant)

In a second variant, a virtual garden is displayed on the entirety of the plurality of floor displays 200. An image of the garden displayed on the floor displays 200 is generated by computer graphics. A plurality of treasures are dispersedly buried under the ground of the garden. When a user carrying the mobile terminal 10 comes close to a location at which a treasure is buried, a "dig" button is displayed on the second LCD 12 of the mobile terminal 10. Then, when the user touches the "dig" button, one of the floor displays 200 on which the user stands displays an animation in which the ground displayed thereon is dug and then the treasure appears. As described above, the user can play a treasure hunt. Note that a mechanism which displays the "dig" button when the user comes close to a location at which a treasure is buried can be realized in a similar manner to that of the "discover" button described above. Also, a mechanism which displays the animation in which the treasure appears can be realized in a similar manner to that of the event picture described above.

While the example embodiment presented herein has been described in detail, the foregoing description is in all aspects illustrative and not restrictive. It is understood that numerous other modifications and variations can be devised without departing from the scope of the embodiment.

What is claimed is:

1. A position detecting system comprising:
   a positional information transmission device for transmitting positional information;
   a mobile terminal for receiving the positional information; and
   a control device capable of communicating with the mobile terminal,
   the positional information transmission device including:
      a plurality of positional information transmitters arranged in an array on a ceiling for transmitting the positional information to a plurality of unit spaces which are each uniquely assigned to the plurality of positional information transmitters,
      wherein each of the positional information transmitters include a plurality of infrared emitters which emit the positional information through a modulated infrared signal,
   the mobile terminal carried by a user and including:
      first display unit for displaying a first image;
      first receiving programmed logic circuitry for receiving the positional information transmitted from the positional information transmitters;
      first image processing programmed logic circuitry for changing the first image in accordance with the positional information received by the first receiving programmed logic circuitry;
      operation elements for accepting an instruction inputted by a user; and
      transmission programmed logic circuitry for transmitting, to the control device, current positional information corresponding to the positional information received by the receiving programmed logic circuitry, said current positional information generated by current positional information generating programmed logic circuitry, and operation information indicating the instruction inputted by the user through the operation elements, the control device arranged separately from the mobile terminal and the positional information transmission device and including:
  second display unit arranged on a floor for displaying a second image;
  second receiving programmed logic circuitry for receiving the current positional information and the operation information transmitted from the mobile terminal; and
  second image processing programmed logic circuitry for changing the second image in accordance with the current positional information and the operation information received by the second receiving programmed logic circuitry, wherein each of the positional information transmitters transmits the positional information for a predetermined number of times at an interval of a predetermined period of time, and the current positional information generating programmed logic circuitry of the mobile terminal measures, for the predetermined period of time, the number of times each piece of the positional information was received by the first receiving programmed logic circuitry, and generates the current positional information based on said measured number of times each piece of the positional information was received and the predetermined number of times each of the positional information transmitters transmitted the positional information.

2. The position detecting system according to claim 1, wherein
  the current positional information generating programmed logic circuitry generates the current positional information indicating a position which is more accurate than that indicated by the positional information, based on a ratio of the number of times each piece of the positional information is successfully received, for the predetermined period of time, by the first receiving programmed logic circuitry, to the total number of times each piece of the positional information is transmitted for the predetermined period of time.

3. The position detecting system according to claim 2, wherein the current positional information generating programmed logic circuitry calculates a weighted average of the positional information by averaging the positional information received for the predetermined period of time by the first receiving programmed logic circuitry, in accordance with the receiving frequency of the positional information, such that the current positional information generating programmed logic circuitry generates the current positional information.

4. A position detecting system comprising:
  a positional information transmission device for transmitting positional information;
  a mobile terminal for receiving the positional information; and
  a control device capable of communicating with the mobile terminal,
  the positional information transmission device including:
    a plurality of positional information transmitters arranged in an array on a ceiling for transmitting the positional information to a plurality of unit spaces which are each uniquely assigned to the plurality of positional information transmitters,
    wherein each of the positional information transmitters include a plurality of infrared emitters which emit the positional information through a modulated infrared signal,
  the mobile terminal carried by a user and including:
    first display unit for displaying a first image;
    first receiving programmed logic circuitry for receiving the positional information transmitted from the positional information transmitters;
    first image processing programmed logic circuitry for changing the first image in accordance with the positional information received by the first receiving programmed logic circuitry;
    operation elements for accepting an instruction inputted by a user; and
    transmission programmed logic circuitry for transmitting, to the control device, current positional information corresponding to the positional information received by the receiving programmed logic circuitry, said current positional information generated by current positional information generating programmed logic circuitry, and operation information indicating the instruction inputted by the user through the operation elements,
  and the control device arranged separately from the mobile terminal and the positional information transmission device and including:
    second display unit arranged on a floor for displaying a second image;
    second receiving programmed logic circuitry for receiving the current positional information and the operation information transmitted from the mobile terminal; and
    second image processing programmed logic circuitry for changing the second image in accordance with the current positional information and the operation information received by the second receiving programmed logic circuitry, wherein
  the current positional information generating programmed logic circuitry of the mobile terminal measures, for a predetermined period of time, the number of times each piece of the positional information was received by the first receiving programmed logic circuitry, and generates the current positional information based on said measured number of times each piece of the positional information was received and a number of times each of the positional information transmitters transmitted the positional information, wherein
  the first image includes a button image, and
  the first image processing programmed logic circuitry changes a display mode of the button image between a first display mode indicating the button image is selectable by the user and a second display mode indicating the button image is not selectable by the user in accordance with the positional information received by the first receiving programmed logic circuitry.

5. A non-transitory computer-readable physical storage medium having tangibly recorded thereon a position detecting program executed by a computer of a mobile terminal and a computer of a control device in a position detecting system comprising:
  a positional information transmission device including a plurality of positional information transmitters arranged in an array on a ceiling for transmitting positional information to a plurality of unit spaces which are each uniquely assigned to the plurality of positional information transmitters;

the mobile terminal carried by a user for receiving the positional information; and the control device arranged separately from the mobile terminal and the positional information transmission device and capable of communicating with the mobile terminal, the position detecting program instructing the computer of the mobile terminal to perform:

first display control for causing a first display unit of the mobile terminal to display a first image;

first receiving control for causing first receiving programmed logic circuitry of the mobile terminal to receive the positional information transmitted from the positional information transmitters;

first image processing for changing the first image in accordance with the positional information received by the first receiving programmed logic circuitry; and transmission control for causing transmission programmed logic circuitry of the mobile terminal to transmit to the control device current positional information corresponding to the positional information received by the receiving programmed logic circuitry and operation information, inputted by operation elements of the mobile terminal, which indicates an instruction of a user, and the position detecting program instructing the computer of the control device to perform:

second display control for causing a second display unit of the control device arranged on a floor to display a second image;

second receiving control for causing second receiving programmed logic circuitry of the control device to receive the current positional information and the operation information transmitted from the mobile terminal; and second image processing for changing the second image in accordance with the current positional information and the operation information received by the second receiving programmed logic circuitry, wherein each of the positional information transmitters transmits the positional information for a predetermined number of times at an interval of a predetermined period of time, and the current positional information generating programmed logic circuitry of the mobile terminal measures, for the predetermined period of time, the number of times each piece of the positional information was received by the first receiving programmed logic circuitry, and generates the current positional information based on said measured number of times each piece of the positional information was received and the predetermined number of times each of the positional information transmitters transmitted the positional information.

6. A non-transitory computer-readable physical storage medium having tangibly recorded thereon a position detecting program executed by a computer of a mobile terminal and a computer of a control device in a position detecting system comprising:

a positional information transmission device including a plurality of positional information transmitters arranged in an array on a ceiling for transmitting positional information to a plurality of unit spaces which are each uniquely assigned to the plurality of positional information transmitters;

the mobile terminal carried by a user for receiving the positional information; and the control device arranged separately from the mobile terminal and the positional information transmission device and capable of communicating with the mobile terminal, the position detecting program instructing the computer of the mobile terminal to perform:

first display control for causing a first display unit of the mobile terminal to display a first image;

first receiving control for causing first receiving programmed logic circuitry of the mobile terminal to receive the positional information transmitted from the positional information transmitters;

first image processing for changing the first image in accordance with the positional information received by the first receiving programmed logic circuitry; and transmission control for causing transmission programmed logic circuitry of the mobile terminal to transmit to the control device current positional information corresponding to the positional information received by the receiving programmed logic circuitry and operation information, inputted by operation elements of the mobile terminal, which indicates an instruction of a user, and the position detecting program instructing the computer of the control device to perform:

second display control for causing a second display unit of the control device arranged on a floor to display a second image;

second receiving control for causing second receiving programmed logic circuitry of the control device to receive the current positional information and the operation information transmitted from the mobile terminal; and second image processing for changing the second image in accordance with the current positional information and the operation information received by the second receiving programmed logic circuitry, wherein the current positional information generating programmed logic circuitry of the mobile terminal measures, for a predetermined period of time, the number of times each piece of the positional information was received by the first receiving programmed logic circuitry, and generates the current positional information based on said measured number of times each piece of the positional information was received and a number of times each of the positional information transmitters transmitted the positional information, wherein the first image includes a button image, and the first image processing programmed logic circuitry changes a display mode of the button image between a first display mode indicating the button image is selectable by the user and a second display mode indicating the button image is not selectable by the user in accordance with the positional information received by the first receiving programmed logic circuitry.

7. A position detecting system comprising:

a positional information transmission device for transmitting positional information;

a mobile terminal for receiving the positional information; and a control device capable of communicating with the mobile terminal, the positional information transmission device including:

a plurality of positional information transmitters arranged in an array on a ceiling for transmitting the positional information to a plurality of unit spaces which are each uniquely assigned to the plurality of positional information transmitters,
wherein each of the positional information transmitters include a plurality of infrared emitters which emit the positional information through a modulated infrared signal,
the mobile terminal carried by a user and including:
    first display unit for displaying a first image;
    first receiving programmed logic circuitry for receiving the positional information transmitted from the positional information transmitters;
    first image processing programmed logic circuitry for changing the first image in accordance with the positional information received by the first receiving programmed logic circuitry;
    operation elements for accepting an instruction inputted by a user; and
    transmission programmed logic circuitry for transmitting, to the control device, current positional information corresponding to the positional information received by the receiving programmed logic circuitry, said current positional information generated by current positional information generating programmed logic circuitry, and operation information indicating the instruction inputted by the user through the operation elements,
the control device arranged separately from the mobile terminal and the positional information transmission device and including:
    second display unit arranged on a floor for displaying a second image;
    second receiving programmed logic circuitry for receiving the current positional information and the operation information transmitted from the mobile terminal; and
    second image processing programmed logic circuitry for changing the second image in accordance with the current positional information and the operation information received by the second receiving programmed logic circuitry, wherein
the current positional information generating programmed logic circuitry of the mobile terminal measures, for a predetermined period of time, the number of times each piece of the positional information was received by the first receiving programmed logic circuitry, and generates the current positional information based on said measured number of times each piece of the positional information was received and a predetermined number of times each of the positional information transmitters transmitted the positional information, wherein
when positional information is emitted to a unit space, positional information for adjacent unit spaces is not emitted.

8. A non-transitory computer-readable physical storage medium having tangibly recorded thereon a position detecting program executed by a computer of a mobile terminal and a computer of a control device in a position detecting system comprising:

a positional information transmission device including a plurality of positional information transmitters arranged in an array on a ceiling for transmitting positional information to a plurality of unit spaces which are each uniquely assigned to the plurality of positional information transmitters;
the mobile terminal carried by a user for receiving the positional information; and
the control device arranged separately from the mobile terminal and the positional information transmission device and capable of communicating with the mobile terminal,
the position detecting program instructing the computer of the mobile terminal to perform:
    first display control for causing a first display unit of the mobile terminal to display a first image;
    first receiving control for causing first receiving programmed logic circuitry of the mobile terminal to receive the positional information transmitted from the positional information transmitters;
    first image processing for changing the first image in accordance with the positional information received by the first receiving programmed logic circuitry; and
    transmission control for causing transmission programmed logic circuitry of the mobile terminal to transmit to the control device current positional information corresponding to the positional information received by the receiving programmed logic circuitry and operation information, inputted by operation elements of the mobile terminal, which indicates an instruction of a user, and
the position detecting program instructing the computer of the control device to perform:
    second display control for causing a second display unit of the control device arranged on a floor to display a second image;
    second receiving control for causing second receiving programmed logic circuitry of the control device to receive the current positional information and the operation information transmitted from the mobile terminal; and
    second image processing for changing the second image in accordance with the current positional information and the operation information received by the second receiving programmed logic circuitry, wherein
the current positional information generating programmed logic circuitry of the mobile terminal measures, for a predetermined period of time, the number of times each piece of the positional information was received by the first receiving programmed logic circuitry, and generates the current positional information based on said measured number of times each piece of the positional information was received and a predetermined number of times each of the positional information transmitters transmitted the positional information, wherein
when positional information is emitted in a unit space, positional information for adjacent spaces is not emitted.

* * * * *